US011835873B2

(12) United States Patent
Hashimoto et al.

(10) Patent No.: US 11,835,873 B2
(45) Date of Patent: Dec. 5, 2023

(54) TONER AND TWO COMPONENT DEVELOPER

(71) Applicant: CANON KABUSHIKI KAISHA, Tokyo (JP)

(72) Inventors: Takeshi Hashimoto, Ibaraki (JP); Kentaro Kamae, Kanagawa (JP); Ichiro Kanno, Chiba (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 17/116,402

(22) Filed: Dec. 9, 2020

(65) Prior Publication Data

US 2021/0181647 A1 Jun. 17, 2021

(30) Foreign Application Priority Data

Dec. 13, 2019 (JP) ................................ 2019-225482

(51) Int. Cl.
| | |
|---|---|
| *G03G 9/087* | (2006.01) |
| *C08G 63/183* | (2006.01) |
| *C08F 220/06* | (2006.01) |
| *C08F 220/18* | (2006.01) |
| *C08F 212/10* | (2006.01) |
| *C08F 220/46* | (2006.01) |
| *G03G 9/08* | (2006.01) |

(52) U.S. Cl.
CPC ........ *G03G 9/08711* (2013.01); *C08F 212/10* (2013.01); *C08F 220/06* (2013.01); *C08F 220/1818* (2020.02); *C08F 220/46* (2013.01); *C08G 63/183* (2013.01); *G03G 9/0819* (2013.01); *G03G 9/08755* (2013.01)

(58) Field of Classification Search
CPC ............. G03G 9/08711; G03G 9/0819; G03G 9/08755; C08F 220/1818; C08F 220/06; C08F 220/46; C08F 212/10; C08G 63/183
See application file for complete search history.

(56) References Cited

U.S. PATENT DOCUMENTS

| | | | |
|---|---|---|---|
| 8,084,174 B2 | 12/2011 | Hasegawa et al. | |
| 8,323,726 B2 | 12/2012 | Naka et al. | |
| 8,921,023 B2 | 12/2014 | Baba et al. | |
| 8,927,188 B2 | 1/2015 | Naka et al. | |
| 8,974,994 B2 | 3/2015 | Kamae et al. | |
| 8,986,914 B2 | 3/2015 | Fujikawa et al. | |
| 9,057,970 B2 | 6/2015 | Ida et al. | |
| 9,058,924 B2 | 6/2015 | Komatsu et al. | |
| 9,063,443 B2 | 6/2015 | Ishigami et al. | |
| 9,152,088 B1 | 10/2015 | Kobori et al. | |
| 9,348,247 B2 | 5/2016 | Ida et al. | |
| 9,348,253 B2 | 5/2016 | Kanno et al. | |
| 9,377,705 B2 * | 6/2016 | Shimano | G03G 9/08795 |
| 9,417,540 B2 | 8/2016 | Hashimoto et al. | |
| 9,436,112 B2 | 9/2016 | Iwasaki et al. | |
| 9,540,483 B2 | 1/2017 | Ida et al. | |
| 9,575,426 B2 * | 2/2017 | Shimano | G03G 9/09371 |
| 9,651,883 B2 | 5/2017 | Hama et al. | |
| 9,665,023 B2 | 5/2017 | Kamae et al. | |
| 9,665,026 B2 | 5/2017 | Iwasaki et al. | |
| 9,696,644 B2 | 7/2017 | Ida et al. | |
| 9,897,934 B2 | 2/2018 | Tamura et al. | |
| 9,915,885 B2 | 3/2018 | Katsumata et al. | |
| 9,969,834 B2 | 5/2018 | Ohtsu et al. | |
| 10,012,918 B2 | 7/2018 | Ishigami et al. | |
| 10,012,920 B2 | 7/2018 | Shibata et al. | |
| 10,012,921 B2 | 7/2018 | Kamae et al. | |
| 10,036,970 B2 | 7/2018 | Kanno et al. | |
| 10,078,281 B2 | 9/2018 | Ida et al. | |
| 10,082,743 B2 | 9/2018 | Hama et al. | |
| 10,088,765 B2 | 10/2018 | Miyakai et al. | |
| 10,133,201 B2 | 11/2018 | Kamae et al. | |
| 10,146,146 B2 | 12/2018 | Komatsu et al. | |

(Continued)

FOREIGN PATENT DOCUMENTS

| | | |
|---|---|---|
| DE | 112013006273 T5 | 10/2015 |
| JP | 2014130243 A | 7/2014 |

(Continued)

OTHER PUBLICATIONS

Krevelen, et al., Properties of Polymers: Their Correlation with Chemical Structure; their Numerical Estimation and Prediction from Additive Group Contributions, 4th Edition, Elsevier Science (2009) 198-204.
U.S. Appl. No. 17/092,602, Kentaro Kamae, filed Nov. 9, 2020.
U.S. Appl. No. 17/117,444, Ichiro Kanno, filed Dec. 10, 2020.
U.S. Appl. No. 17/117,883, Ichiro Kanno,, filed Dec. 10, 2020.

(Continued)

*Primary Examiner* — Peter L Vajda
*Assistant Examiner* — Boone Alexander Evans
(74) *Attorney, Agent, or Firm* — VENABLE LLP

(57) ABSTRACT

A toner has a toner particle containing a binder resin having a first resin and a second resin. The first resin is a crystalline resin, the second resin is an amorphous resin, and the first resin has a first monomer unit, a second monomer unit and a third monomer unit, each having a specific structure. A content of the first monomer unit a content of the third monomer unit in the first resin, and an SP value of the second monomer unit all satisfy a specific ranges, and the second resin contains at least one vinyl-based resin and/or specific hybrid resin, with a cross section of the toner having a domain-matrix structure formed of a matrix including the first resin and domains including the second resin, a number average diameter of the domains being 0.10 to 2.00 μm.

14 Claims, No Drawings

(56) References Cited

U.S. PATENT DOCUMENTS

| | | | |
|---|---|---|---|
| 10,175,595 B2 | 1/2019 | Onozaki et al. | |
| 10,197,936 B2 | 2/2019 | Onozaki et al. | |
| 10,203,619 B2 | 2/2019 | Yamashita et al. | |
| 10,216,108 B2 | 2/2019 | Iwasaki et al. | |
| 10,228,629 B2 | 3/2019 | Tamura et al. | |
| 10,234,777 B2 | 3/2019 | Ohtsu et al. | |
| 10,274,851 B2 | 4/2019 | Hashimoto et al. | |
| 10,353,312 B2 | 7/2019 | Kamae et al. | |
| 10,401,748 B2 | 9/2019 | Hashimoto et al. | |
| 10,423,086 B2 | 9/2019 | Hama et al. | |
| 10,423,090 B2 | 9/2019 | Ohtsu et al. | |
| 10,451,986 B2 | 10/2019 | Sano et al. | |
| 10,451,990 B2 | 10/2019 | Kamae et al. | |
| 10,474,049 B2 | 11/2019 | Onozaki et al. | |
| 10,514,624 B2 | 12/2019 | Tamura et al. | |
| 10,564,560 B2 | 2/2020 | Onozaki et al. | |
| 10,599,060 B2 | 3/2020 | Kanno et al. | |
| 10,656,545 B2 | 5/2020 | Kamae et al. | |
| 10,775,710 B1 | 9/2020 | Kamae et al. | |
| 2011/0237719 A1* | 9/2011 | Inoue | C08K 5/0066 524/127 |
| 2012/0052434 A1* | 3/2012 | Sugimoto | G03G 9/08797 430/108.8 |
| 2013/0108955 A1 | 5/2013 | Shibata et al. | |
| 2013/0244159 A1 | 9/2013 | Ishigami et al. | |
| 2013/0288173 A1 | 10/2013 | Hashimoto et al. | |
| 2014/0134535 A1 | 5/2014 | Baba et al. | |
| 2014/0308611 A1 | 10/2014 | Shimano | |
| 2014/0329176 A1 | 11/2014 | Kanno et al. | |
| 2015/0037718 A1 | 2/2015 | Morita | |
| 2015/0099227 A1 | 4/2015 | Ida et al. | |
| 2015/0220011 A1 | 8/2015 | Miyaake | |
| 2016/0109820 A1 | 4/2016 | Hashimoto et al. | |
| 2016/0246198 A1* | 8/2016 | Fujisaki | G03G 9/08797 |
| 2017/0315463 A1* | 11/2017 | Onozaki | G03G 9/08704 |
| 2018/0143552 A1* | 5/2018 | Sugawara | G03G 9/0819 |
| 2018/0275540 A1 | 9/2018 | Matsuo et al. | |
| 2018/0307149 A1* | 10/2018 | Chiba | G03G 9/081 |
| 2018/0307153 A1 | 10/2018 | Kanno et al. | |
| 2018/0314176 A1 | 11/2018 | Ikeda et al. | |
| 2018/0329331 A1* | 11/2018 | Kurano | G03G 9/1136 |
| 2020/0057397 A1 | 2/2020 | Murayama et al. | |
| 2020/0073263 A1 | 3/2020 | Hama et al. | |
| 2020/0166862 A1 | 5/2020 | Onozaki et al. | |
| 2020/0183295 A1 | 6/2020 | Kanno et al. | |
| 2020/0233327 A1 | 7/2020 | Honda | |
| 2020/0272068 A1 | 8/2020 | Ochi et al. | |
| 2020/0301301 A1 | 9/2020 | Chimoto et al. | |

FOREIGN PATENT DOCUMENTS

| | | |
|---|---|---|
| JP | 2014142632 A | 8/2014 |
| JP | 2019073731 A | 11/2019 |
| WO | 2019073731 A | 11/2019 |

OTHER PUBLICATIONS

U.S. Appl. No. 17/118,960, Masayuki Hama, filed Dec. 11, 2020.
U.S. Appl. No. 17/188,041, Takeshi Hashimoto, filed Mar. 1, 2021.
U.S. Appl. No. 17/189,794, Kentaro Kamae, filed Mar. 2, 2021.

* cited by examiner

TONER AND TWO COMPONENT DEVELOPER

BACKGROUND OF THE INVENTION

Field of the Invention

The present disclosure relates to a toner able to be used in electrophotography systems, electrostatic recording systems, electrostatic printing systems and toner jet systems, and relates to a two component developer using the toner.

Description of the Related Art

As electrophotographic full color copiers have proliferated in recent years, there has been increased demand for higher printer speeds and greater energy savings. To achieve high-speed printing, techniques have been studied for melting the toner more rapidly in the fixing step. Techniques have also been studied for reducing the various control times within jobs and between jobs in order to increase productivity. As strategies for saving energy, techniques have been studied for fixing the toner at a lower temperature in order to reduce the energy expenditure in the fixing step.

It is known that when a crystalline resin having sharp melt properties is used as a principal component of a binder resin in a toner, the toner has more excellent low-temperature fixability than a toner having an amorphous resin as a principal component. Many toners have been proposed, which contain crystalline polyesters as resins having sharp melt properties. However, crystalline polyesters have been problematic in terms of charging stability in high-temperature high-humidity environments, and especially in terms of maintaining charging performance after being left in high-temperature high-humidity environments.

Various toners have also been proposed, which use crystalline vinyl resins as other types of crystalline resins having sharp melt properties.

For example, Japanese Patent Application Publication No. 2014-130243 proposes a toner, with which both low-temperature fixability and heat-resistant storage stability are achieved, by using an acrylate resin having crystallinity in side-chains.

The toner of the above patent document can provide both low-temperature fixability and heat-resistant storage stability, and also provides improvement to a certain extent in charging stability, which has been a weak point of toners using crystalline polyester resins. However, it has been found that a toner using a crystalline vinyl resin as a binder resin is liable to hot offset and wrapping because viscosity thereof is too low in high-temperature regions, and has a narrow temperature range for fixing.

As a result, investigations have been carried out into addition of amorphous resins to crystalline resins in order to increase the viscosity of a toner after melting.

For example, WO2019/073731 proposes a toner using a binder resin that contains both a crystalline vinyl-based resin and a polyester resin that has been crosslinked by a carbon-carbon bond. The toner disclosed in WO2019/073731 can maintain a fixing range to a certain extent, but further improvements are required.

SUMMARY OF THE INVENTION

The present disclosure provides a toner which exhibits excellent low-temperature fixability and exhibits both hot offset resistance and winding resistance.

A toner comprising a toner particle containing a binder resin including a first resin and a second resin, wherein
the first resin is a crystalline resin,
the second resin is an amorphous resin,
the first resin has:
a first monomer unit represented by formula (1) below;
a second monomer unit that is at least one selected from the group consisting of a monomer unit represented by formula (3) below and a monomer unit represented by formula (4) below; and
a third monomer unit represented by formula (5) below,
a content ratio of the first monomer unit in the first resin is at least 30.0 mass %,
a content ratio of the third monomer unit in the first resin is 10.0 mass % to 50.0 mass % and when an SP value $(J/cm^3)^{0.5}$ of the second monomer unit is denoted by $SP_{21}$, $SP_{21}$ satisfies formula (2) below:

$$21.00 \leq SP_{21} \tag{2}$$

the second resin contains at least one resin selected from the group consisting of a vinyl-based resin and a hybrid resin in which a vinyl-based resin and a polyester resin are bound to each other,
an observed cross section of the toner has a domain-matrix structure formed of a matrix that includes the first resin and domains that include the second resin, and
a number average diameter of the domains is 0.10 to 2.00 µm:

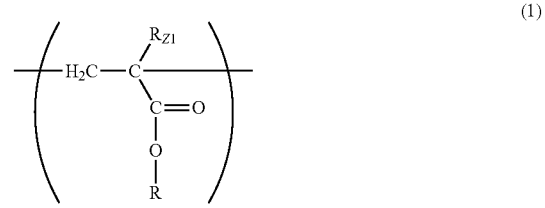

(1)

in formula (1), $R_{Z1}$ denotes a hydrogen atom or a methyl group, and R denotes an alkyl group having 18 to 36 carbon atoms,

(3)

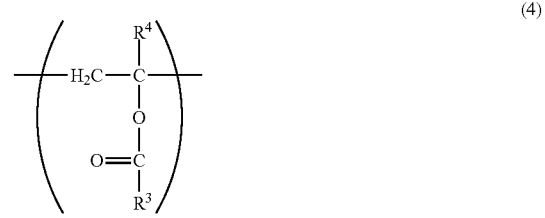

(4)

in formula (3), X denotes a single bond or an alkylene group having 1 to 6 carbon atoms,
$R^1$ denotes —C≡N,
—C(=O)NHR$^{10}$ (where $R^{10}$ is a hydrogen atom or an alkyl group having 1 to 4 carbon atoms), a hydroxyl group,
—COOR$^{11}$ (where R$^{11}$ is a hydrogen atom, an alkyl group having 1 to 6 (preferably 1 to 4) carbon atoms or a hydroxyalkyl group having 1 to 6 (preferably 1 to 4) carbon atoms),
—NH—C(=O)—N(R$^{13}$)$_2$ (where R$^{13}$ groups are each independently a hydrogen atom or an alkyl group having 1 to 6 (preferably 1 to 4) carbon atoms),
—COO(CH$_2$)$_2$NHCOOR$^{14}$ (where R$^{14}$ is an alkyl group having 1 to 4 carbon atoms) or
—COO(CH$_2$)$_2$—NH—C(=O)—N(R$^{15}$)$_2$ (where R$^{15}$ groups are each independently a hydrogen atom or an alkyl group having 1 to 6 carbon atoms), and
R$^2$ denotes a hydrogen atom or a methyl group,
In formula (4), R$^3$ denotes an alkyl group having 1 to 4 carbon atoms, and R$^4$ denotes a hydrogen atom or a methyl group.

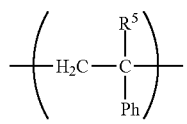

(5)

in formula (5), R$^5$ denotes a hydrogen atom or a methyl group, and Ph denotes a phenyl group.

According to the present disclosure, it is possible to provide a toner which exhibits excellent low-temperature fixability and exhibits both hot offset resistance and winding resistance.

Further features of the present invention will become apparent from the following description of exemplary embodiments.

DESCRIPTION OF THE EMBODIMENTS

Unless otherwise specified, descriptions of numerical ranges such as "from X to Y" or "X to Y" in the present disclosure include the numbers at the upper and lower limits of the range.

In the present disclosure, a (meth)acrylic acid ester means an acrylic acid ester and/or a methacrylic acid ester.

When numerical ranges are described in stages, the upper and lower limits of each of each numerical range may be combined arbitrarily.

The term "monomer unit" describes a reacted form of a monomeric material in a polymer. For example, one carbon-carbon bonded section in a principal chain of polymerized vinyl monomers in a polymer is given as one unit. A vinyl monomer can be represented by the following formula (Z):

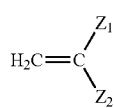

(Z)

In formula (Z), Z$_1$ denotes a hydrogen atom or an alkyl group (preferably an alkyl group with 1 to 3 carbon atoms, and more preferably a methyl group), and Z$_2$ denotes an arbitrary substituent group. A crystalline resin means a resin that gives a clear endothermic peak in differential scanning calorimetry (DSC) measurements.

This toner has a toner particle containing a binder resin having a first resin and a second resin, the first resin is a crystalline resin, the second resin is an amorphous resin, the first resin has a first monomer unit represented by formula (1) below, a second monomer unit that is at least one selected from the group consisting of a monomer unit represented by formula (3) below and a monomer unit represented by formula (4) below, and a third monomer unit represented by formula (5) below, a content ratio of the first monomer unit in the first resin is at least 30.0 mass %, a content ratio of the third monomer unit in the first resin is 10.0 to 70.0 mass % and when the SP value (J/cm$^3$)$^{0.5}$ of the second monomer unit is denoted by SP$_{21}$, SP$_{21}$ satisfies formula (2) below:

$$21.00 \leq SP_{21} \qquad (2)$$

the second resin contains at least one resin selected from the group consisting of a vinyl-based resin and a hybrid resin in which a vinyl-based resin and a polyester resin are bound to each other, an observed cross section of the toner has a domain-matrix structure formed of a matrix that includes the first resin and domains that include the second resin, and the number average diameter of the domains is 0.10 to 2.00 µm.

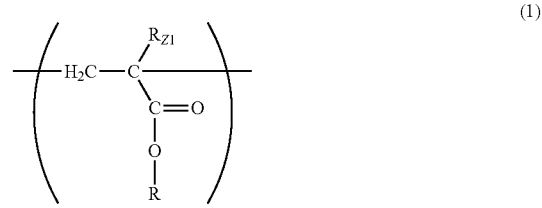

(1)

[In formula (1), R$_{Z1}$ denotes a hydrogen atom or a methyl group, and R denotes and alkyl group having 18 to 36 carbon atoms.]

(3)

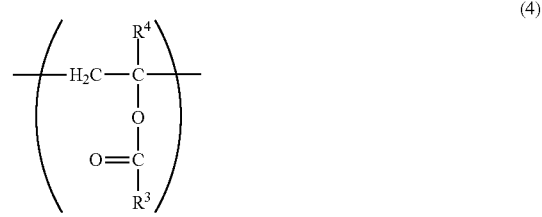

(4)

In formula (3), X denotes a single bond or an alkylene group having 1 to 6 carbon atoms, $R^1$ denotes —C≡N, —C(=O)$NHR^{10}$ (where $R^{10}$ denotes a hydrogen atom or an alkyl group having 1 to 4 carbon atoms), a hydroxyl group, —$COOR^{11}$ (where $R^{11}$ denotes a hydrogen atom, an alkyl group having 1 to 6 carbon atoms (and preferably 1 to 4 carbon atoms) or a hydroxyalkyl group having 1 to 6 carbon atoms (and preferably 1 to 4 carbon atoms), —NH—C(=O)—N($R^{13}$)$_2$ (where $R^{13}$ groups are each independently a hydrogen atom or an alkyl group having 1 to 6 carbon atoms (and preferably 1 to 4 carbon atoms)), —COO(CH$_2$)$_2$NHCOO$R^{14}$ (where $R^{14}$ denotes an alkyl group having 1 to 4 carbon atoms) or —COO(CH$_2$)$_2$—NH—C(=O)—N($R^{15}$)$_2$ (where $R^{15}$ groups are each independently a hydrogen atom or an alkyl group having 1 to 6 carbon atoms), and $R^2$ denotes a hydrogen atom or a methyl group.

In formula (4), $R^3$ denotes an alkyl group having 1 to 4 carbon atoms, and $R^4$ denotes a hydrogen atom or a methyl group.

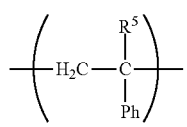

(5)

[In formula (5), $R^5$ denotes a hydrogen atom or a methyl group, and Ph denotes a phenyl group.]

The inventors of the present invention found that in cases where a crystalline vinyl-based resin was used as a primary component of the binder resin, the fixation temperature range was not necessarily broadened even if viscoelasticity in a high temperature region was imparted by adding an amorphous resin. It was understood that low-temperature fixability and hot offset resistance both decreased in some cases.

Furthermore, it was found that in cases where an observed cross section of the toner has a domain-matrix structure formed of a matrix that includes the first resin that is a crystalline resin and domains that include the second resin that is an amorphous resin, there is a correlation between the number average diameter of the domains and the fixation temperature range.

The inventors of the present invention have considered the following matters with respect to this correlation.

In the domain-matrix structure of the toner cross section, the matrix exhibits excellent low-temperature fixability by containing the first resin that is a crystalline resin.

Here, in cases where the number average diameter of the domains exceeds 2.00 μm, the crystalline resin contained in the matrix melts when the toner is fixed at a low temperature, but the amorphous resin contained in the domains is unlikely to melt. As a result, the domains are unlikely to be fixed on a paper, and fixing defects are likely to occur.

Meanwhile, when the toner is fixed at a high temperature, the viscosity of the matrix that includes the molten crystalline resin tends to become too low, meaning that hot offset resistance and winding resistance tend to decrease.

In addition, in cases where the number average diameter of the domains is less than 0.10 μm or in cases where the crystalline resin and the amorphous resin are compatible with each other and form a uniform structure rather than a domain-matrix structure, hot offset resistance and winding resistance tend to decrease. Furthermore, sharp melt properties of the crystalline resin tend to be lost, and low-temperature fixability tends to decrease.

In addition, in the case of a domain-matrix structure in which the matrix is constituted from an amorphous resin and the domains are constituted from a crystalline resin, melting characteristics tend to be controlled by the amorphous resin, sharp melt properties of the crystalline resin are not sufficiently exhibited, and low-temperature fixability tends to decrease.

Moreover, it is preferable for an observed cross section of the toner to have a domain-matrix structure formed of a matrix that is constituted from the first resin that is a crystalline resin, and domains that are constituted from the second resin that is an amorphous resin. Even in such a case, the matrix may contain an amorphous resin and the domains may contain a crystalline resin as long as the advantageous effect of the present disclosure is not impaired.

The number average diameter of the domains is preferably 0.10 to 1.50 μm, and more preferably 0.20 to 1.00 μm.

The number average diameter of the domains can be controlled by altering the composition of monomers that constitute the crystalline resin, the composition of monomers that constitute the amorphous resin, toner particle production conditions, and the like.

In an observed cross section of the toner, the ratio of the area of the domains relative to the area of the toner cross section (hereinafter also referred to simply as the domain areal ratio) is preferably 15% to 80%.

The domain areal ratio is preferably 20% to 70%, and more preferably 30% to 60%.

In cases where the domain areal ratio falls within the range mentioned above, the low-temperature fixability and hot offset resistance of the toner can be achieved at a higher level.

The domain areal ratio can be altered by controlling the mixing ratio of the crystalline resin and the amorphous resin in the binder resin, the difference in polarity between the crystalline resin and the amorphous resin, and the like.

In general, it is often the case that the resin having the higher blending amount forms the matrix and the resin having the lower blending amount forms the domains. However, because the viscosity of the crystalline resin is low after melting, in cases where there is a step in which a temperature that is at least the melting point of the crystalline resin is applied during production of the toner particle, even if the blending mass ratio of the crystalline resin is low, the matrix may be formed from the crystalline resin. Examples of such a production step include a kneading step in a melt kneading method and a melt adhesion step in an emulsion aggregation method.

The binder resin contains the first resin, and the first resin is a crystalline resin.

The first resin has a first monomer unit represented by formula (1) below.

In addition, the content ratio of the first monomer unit in the first resin is at least 30.0 mass %.

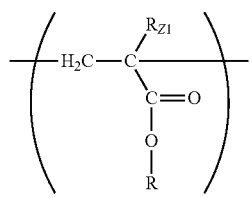

In formula (1), $R_{Z1}$ denotes a hydrogen atom or a methyl group, and R denotes and alkyl group having 18 to 36 carbon atoms. R is preferably an alkyl group having 18 to 30 carbon atoms. In addition, this alkyl group preferably has a straight chain structure.

The first monomer unit has an alkyl group having 18 to 36 carbon atoms represented by R in a side chain, and by having this portion, the first resin tends to exhibit crystallinity.

By setting the content ratio of the first monomer unit in the first resin to be at least 30.0 mass %, the first resin exhibits crystallinity and low-temperature fixability is improved.

In cases where the content ratio of the first monomer unit in the first resin is less than 30.0 mass %, the first resin is unlikely to exhibit crystallinity and low-temperature fixability deteriorates. This content ratio is preferably at least 40.0 mass %, and more preferably at least 50.0 mass %. However, the upper limit for this content is preferably less than 90.0 mass %, not more than 80.0 mass % or not more than 70.0 mass %.

In addition, the first resin exhibits superior charge maintaining properties in high temperature high humidity environments in comparison with crystalline polyesters that are crystalline resins that were well known in the past, possibly because the first resin has a structure that exhibits crystallinity in a side chain.

If the SP value $(J/cm^3)^{0.5}$ of the first monomer unit is denoted by $SP_{11}$, $SP_{11}$ is preferably less than 20.00, more preferably not more than 19.00, and further preferably not more than 18.40. The lower limit for this SP value is not particularly limited, but is preferably at least 17.00.

The first monomer unit represented by formula (1) is preferably a monomer unit derived from at least one selected from the group consisting of the (meth)acrylic acid esters having $C_{18-36}$ alkyl groups (the first polymerizable monomer).

Examples of (meth)acrylic acid esters each having a $C_{18-36}$ alkyl group include (meth)acrylic acid esters each having a $C_{18-36}$ straight-chain alkyl group [stearyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, octacosyl (meth)acrylate, myricyl (meth)acrylate, dotriacontyl (meth)acrylate, etc.] and (meth)acrylic acid esters each having a $C_{18-36}$ branched alkyl group [2-decyltetradecyl (meth)acrylate, etc.].

Of these, at least one selected from the group consisting of (meth)acrylic acid esters having a straight chain alkyl group with 18 to 36 carbon atoms is preferable from the perspective of low-temperature fixability of the toner. At least one selected from the group consisting of (meth)acrylic acid esters having a straight chain alkyl group with 18 to 30 carbon atoms is more preferable. At least one selected from the group consisting of straight chain stearyl (meth)acrylate and behenyl (meth)acrylate is still more preferable.

The first monomer unit may be a single monomer or a combination of at least two types.

The first resin has a second monomer unit which is different from the first monomer unit and which is at least one selected from the group consisting of a monomer unit represented by formula (3) below and a monomer unit represented by formula (4) below.

In addition, if the SP value $(J/cm^3)^{0.5}$ of the second monomer unit is denoted by $SP_{21}$, $SP_{21}$ satisfies formula (2) below. In addition, $SP_{21}$ more preferably satisfies formula (2)' below.

$$21.00 \leq SP_{21} \tag{2}$$

$$21.00 \leq SP_{21} \leq 40.00 \tag{2)'}$$

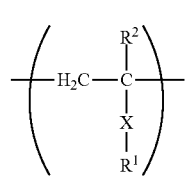

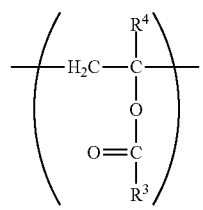

In formula (3), X denotes a single bond or an alkylene group having 1 to 6 carbon atoms, $R^1$ denotes —C≡N,
—C(=O)$NHR^{10}$ (where $R^{10}$ is a hydrogen atom or an alkyl group having 1 to 4 carbon atoms),
a hydroxyl group,
—$COOR^{11}$ (where $R^{11}$ is an alkyl group having 1 to 6 carbon atoms (and preferably 1 to 4 carbon atoms) or a hydroxyalkyl group having 1 to 6 carbon atoms (and preferably 1 to 4 carbon atoms)),
—NH—C(=O)—N$(R^{13})_2$ (where $R^{13}$ groups are each independently a hydrogen atom or an alkyl group having 1 to 6 carbon atoms (and preferably 1 to 4 carbon atoms),
—COO$(CH_2)_2$NHCOO$R^{14}$ (where $R^{14}$ is an alkyl group having 1 to 4 carbon atoms) or
—COO$(CH_2)_2$—NH—C(=O)—N$(R^{15})_2$ (where $R^{15}$ groups are each independently a hydrogen atom or an alkyl group having 1 to 6 carbon atoms), and
$R^2$ denotes a hydrogen atom or a methyl group.

In formula (4), $R^3$ denotes an alkyl group having 1 to 4 carbon atoms and $R^4$ denotes a hydrogen atom or a methyl group.

The first resin contains the second monomer unit, and because crystalline resins exhibit high polarity, adhesion to a fixing paper is improved and cohesive strength between molten toner particles is improved. As a result, scratch resistance is improved.

Examples of a second polymerizable monomer that forms the second monomer unit include the types given below. In addition, the second polymerizable monomer may be a single monomer or a combination of at least two types.

Nitrile group-containing monomers; for example, acrylonitrile and methacrylonitrile.

Hydroxyl group-containing monomers; for example, 2-hydroxyethyl (meth)acrylate and 2-hydroxypropyl (meth)acrylate.

Amido group-containing monomers; for example, acrylamide, and monomers obtained by reacting an amine having 1 to 30 carbon atoms with a carboxylic acid having 2 to 30 carbon atoms and having an ethylenically unsaturated bond (acrylic acid, methacrylic acid, and the like) using a publicly known method.

Urea group-containing monomers: for example, monomers obtained by reacting an amine having 3 to 22 carbon atoms [a primary amine (n-butylamine, t-butylamine, propylamine, isopropylamine, or the like), a secondary amine (di-n-ethylamine, di-n-propylamine, di-n-butylamine, or the like), aniline, cyclohexylamine, or the like] and an isocyanate having 2 to 30 carbon atoms and having an ethylenically unsaturated bond using a publicly known method.

Carboxyl group-containing monomers: for example, methacrylic acid, acrylic acid and 2-carboxyethyl (meth)acrylate.

Of these, use of a monomer having a nitrile group, an amido group, a urethane group, a hydroxyl group or a urea group is preferred. More preferably, the monomer is a monomer having an ethylenically unsaturated bond and at least one type of functional group selected from the group consisting of a nitrile group, an amido group, a urethane group, a hydroxyl group and a urea group. By using these monomers, charge rising performance in low humidity environments is further improved. Of these, nitrile groups are more preferred from the perspectives of exhibiting high electron-withdrawing properties and increasing the speed of charge transfer.

At least one type of vinyl ester selected from the group consisting of vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate and vinyl octanoate may be used as the second polymerizable monomer.

Vinyl esters are a type of non-conjugated monomer and readily maintain an appropriate degree of reactivity with the first polymerizable monomer, and therefore tend to improve the crystallinity of the first resin and tend to exhibit better low-temperature fixability and heat-resistant storage stability.

The second polymerizable monomer preferably has an ethylenically unsaturated bond, and more preferably has one ethylenically unsaturated bond.

The content ratio of the second monomer unit in the first resin is preferably at least 0.1 mass %, at least 1.0 mass % or at least 5.0 mass %, and is preferably not more than 70.0 mass %, not more than 30.0 mass % or not more than 20.0 mass %. In cases where this content ratio is 5.0 mass % to 70.0 mass %, a scratch resistance improvement effect tends to be achieved.

In addition, a monomer unit that satisfies $SP_{21}$ expressed in formula (2) above can be selected as the second monomer unit.

In addition, the first resin has a third monomer unit represented by formula (5), which is derived from styrene or α-methylstyrene.

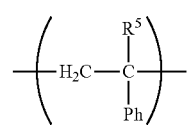

[In formula (5), $R^5$ denotes a hydrogen atom or a methyl group, and Ph denotes a phenyl group.]

The content ratio of the third monomer unit in the first resin is 10.0 mass % to 50.0 mass % from the perspective of charge maintaining properties. The content ratio of the third monomer unit in the first resin is preferably at least 15.0 mass % or at least 20.0 mass %, and is preferably not more than 40.0 mass %.

In addition, the first resin may contain other monomer units at amounts that do not impair the mass ratios of the first monomer unit, second monomer unit and third monomer unit mentioned above.

The first resin is preferably a vinyl polymer. The vinyl polymer may for example be a polymer of a monomer containing ethylenically unsaturated bonds. An ethylenically unsaturated bond is a radical polymerizable carbon-carbon double bond, and examples include vinyl, propenyl, acryloyl and methacryloyl groups and the like.

From the perspective of improving charging performance in high temperature high humidity environments, the acid value AVa of the first resin that is a crystalline resin is preferably not more than 50.0 mg KOH/g, and more preferably not more than 30.0 mg KOH/g. The lower limit thereof is not particularly limited, but is preferably at least 0 mg KOH/g and, from the perspective of improving charge rising performance, is preferably at least 0.5 mg KOH/g, and more preferably at least 1.0 mg KOH/g.

From the perspective of improving charging performance in high temperature high humidity environments, the hydroxyl value OHVa of the first resin that is a crystalline resin is preferably not more than 50.0 mg KOH/g, and more preferably not more than 30.0 mg KOH/g. The lower limit thereof is not particularly limited, but is preferably at least 0 mg KOH/g and, from the perspective of improving charge rising performance, is preferably at least 0.5 mg KOH/g, and more preferably at least 1.0 mg KOH/g.

The weight average molecular weight (Mw) of tetrahydrofuran (THF)-soluble matter in the first resin that is a crystalline resin, as measured by gel permeation chromatography (GPC), is preferably from 10,000 to 200,000, and more preferably at least 20,000 and not more than 150,000. If the weight average molecular weight (Mw) of this THF-soluble matter falls within the range mentioned above, elasticity at temperatures close to room temperature is likely to be maintained.

In addition, the melting point of the first resin that is a crystalline resin is preferably from 50° C. to 80° C., and more preferably from 53° C. to 70° C. If this melting point is at least 50° C., heat-resistant storage stability is improved, and if this melting point is not more than 80° C., low-temperature fixability is improved.

From the perspective of facilitating formation of a domain-matrix structure, the content of the first resin that is a crystalline resin in the binder resin is preferably at least 30 mass %, at least 40 mass % or at least 50 mass %, and is preferably not more than 95 mass %, not more than 90 mass %, not more than 80 mass % or not more than 70 mass %.

The binder resin contains the second resin, and the second resin is an amorphous resin.

The second resin that is an amorphous resin contains at least one resin selected from the group consisting of a vinyl-based resin and a hybrid resin in which a vinyl-based resin and a polyester resin are bound to each other.

In general, vinyl-based resins have lower SP values than polyester resins and are similar in terms of SP value to the first resin that is a crystalline resin. Having similar SP values indicates that resins have similar polarities and that resins tend to be compatible with each other. Therefore, controlling the number average diameter of domains in the domain-matrix structure within the range mentioned above is easier than with a polyester resin.

If the SP value of the first resin is denoted by SP1 $(J/cm^3)^{0.5}$ and the SP value of the second resin is denoted by SP2 $(J/cm^3)^{0.5}$, it is preferable for the relationships represented by the formulae below to be satisfied from the perspectives of ease of formation of a domain-matrix structure and ease of controlling the number average diameter of domains in the domain-matrix structure within the range mentioned above.

$$19.0 \leq SP1$$

$$0.3 \leq SP2-SP1 \leq 1.3$$

It is more preferable for the values of SP1 and SP2 to satisfy the following relationships.

$$19.0 \leq SP1 \leq 21.0$$

$$0.4 \leq SP2-SP1 \leq 1.0$$

In cases where a hybrid resin in which a vinyl-based resin and a polyester resin are bound to each other is used, the content ratio of the vinyl-based resin in the hybrid resin is preferably at least 10 mass %, at least 20 mass %, at least 40 mass %, at least 60 mass % or at least 80 mass %, and is preferably not more than 100 mass % or not more than 90 mass %.

The content of the second resin that is an amorphous resin in the binder resin is preferably at least 4 mass %, at least 5 mass %, at least 10 mass %, at least 20 mass % or at least 30 mass %, and is preferably not more than 70 mass %, not more than 60 mass % or not more than 50 mass %.

Examples of the vinyl-based resin include polymers of polymerizable monomers that include an ethylenically unsaturated bond. An ethylenically unsaturated bond is a carbon-carbon double bond capable of radical polymerization, and examples thereof include vinyl groups, propenyl groups, acryloyl groups and methacryloyl groups.

Examples of the polymerizable monomer include the types listed below.

Styrene-based monomers such as o-methylstyrene, m-methylstyrene, p-methylstyrene, p-phenylstyrene, p-ethyl styrene, 2,4-dimethyl styrene, p-n-butyl styrene, p-tert-butylstyrene, p-n-hexylstyrene, p-n-octylstyrene, p-n-nonylstyrene, p-n-decylstyrene, p-n-dodecyl styrene, p-methoxystyrene, p-chlorostyrene, 3,4-dichlorostyrene, m-nitrostyrene, o-nitrostyrene and p-nitrostyrene;

acrylic acid and acrylic acid esters such as methyl acrylate, ethyl acrylate, propyl acrylate, n-butyl acrylate, isobutyl acrylate, n-octyl acrylate, dodecyl acrylate, 2-ethylhexyl acrylate, stearyl acrylate, 2-chloroethyl acrylate and phenyl acrylate;

α-methylene aliphatic monocarboxylic acids and esters thereof, such as methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate;

Also, acrylonitrile, methacrylonitrile, acrylamide, and the like.

Also, acrylic acid and methacrylic acid esters, such as 2-hydroxyethyl acrylate, 2-hydroxyethyl methacrylate and 2-hydroxypropyl (meth)acrylate; and hydroxyl group-containing polymerizable monomers such as 4-(1-hydroxy-1-methylbutyl)styrene and 4-(1-hydroxy-1-methylhexyl)styrene. Is possible to use one of these polymerizable monomers in isolation or a combination of a plurality of types thereof.

If necessary, a variety of polymerizable monomers capable of vinyl polymerization may additionally be used in the vinyl-based resin in addition to the monomers mentioned above.

Examples of such polymerizable monomers include the types listed below.

Unsaturated monoolefins, such as ethylene, propylene, butylene and isobutylene; unsaturated polyenes, such as butadiene and isoprene; halogenated vinyl compounds, such as vinyl chloride vinylidene chloride, vinyl bromide and vinyl fluoride; vinyl esters, such as vinyl acetate, vinyl propionate and vinyl benzoate; vinyl ethers, such as vinyl methyl ether, vinyl ethyl ether and vinyl isobutyl ether; vinyl ketones, such as vinyl methyl ketone, vinyl hexyl ketone and methyl isopropenyl ketone; N-vinyl compounds, such as N-vinylpyrrole, N-vinylcarbazole, N-vinylindole and N-vinylpyrrolidone; vinylnaphthalene compounds; unsaturated dibasic acids, such as maleic acid, citraconic acid, itaconic acid, alkenylsuccinic acid compounds, fumaric acid and mesaconic acid; unsaturated dibasic acid anhydrides, such as maleic acid anhydride, citraconic acid anhydride, itaconic acid anhydride and alkenylsuccinic acid anhydride compounds; half esters of unsaturated basic acids, such as methyl maleate half ester, ethyl maleate half ester, butyl maleate half ester, methyl citraconate half ester, ethyl citraconate half ester, butyl citraconate half ester, methyl itaconate half ester, methyl alkenylsuccinate half esters, methyl fumarate half ester and ethyl mesaconate half ester; unsaturated basic acid esters, such as dimethyl maleate and dimethyl fumarate; anhydrides of α,β-unsaturated acid such as acrylic acid, methacrylic acid, crotonic acid and cinnamic acid; anhydrides of these α,β-unsaturated acids and lower fatty acids; and carboxylic acid group-containing polymerizable monomers, such as alkenylmalonic acid compounds, alkenylglutaric acid compounds, alkenyladipic acid compounds, and anhydrides and monoesters of these.

In addition, the vinyl-based resin may, if necessary, be a polymer that is crosslinked using a crosslinkable polymerizable monomer such as those exemplified below.

Examples of the crosslinkable polymerizable monomer include the types listed below.

Aromatic divinyl compounds; diacrylate compounds linked by alkyl chains; diacrylate compounds linked by ether bond-containing alkyl chains; diacrylate compounds linked by chains including aromatic groups and ether bonds; polyester type diacrylate compounds; and polyfunctional crosslinking agents. Examples of such aromatic divinyl compounds include divinylbenzene and divinylnaphthalene.

Examples of such diacrylate compounds linked by alkyl chains include ethylene glycol diacrylate, 1,3-butyl ene glycol diacrylate, 1,4-butane diol diacrylate, 1,5-pentane diol diacrylate, 1,6-hexane diol diacrylate, neopentyl glycol diacrylate and compounds in which the acrylate moiety in the compounds mentioned above is replaced with a methacrylate moiety.

The vinyl-based resin is preferably a polymer of polymerizable monomers including at least one selected from the group consisting of styrene, o-methylstyrene, m-methylstyrene, p-methyl styrene, p-phenyl styrene, p-ethyl styrene, 2,4-dimethyl styrene, p-n-butylstyrene, p-tert-butylstyrene, p-n-hexylstyrene, p-n-octylstyrene, p-n-nonylstyrene, p-n-decylstyrene, p-n-dodecyl styrene, p-methoxystyrene, p-chlorostyrene, 3,4-dichlorostyrene, m-nitrostyrene, o-nitrostyrene, p-nitrostyrene, acrylic acid, methyl acrylate, ethyl acrylate, propyl acrylate, n-butyl acrylate, isobutyl acrylate, n-octyl acrylate, dodecyl acrylate, 2-ethylhexyl acrylate, stearyl acrylate, 2-chloroethyl acrylate, phenyl acrylate, methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, acrylonitrile, methacrylonitrile, acrylamide, 2-hydroxyethyl acrylate, 2-hydroxyethyl methacrylate, 2-hydroxypropyl methacrylate, 4-(1-hydroxy-1-methylbutyl)styrene and 4-(1-hydroxy-1-methylhexyl)styrene.

In addition, the vinyl-based resin may be a copolymer of at least one type of polymerizable monomer selected from among the group listed above and at least one type of crosslinkable polymerizable monomer selected from the group consisting of divinylbenzene, divinylnaphthalene, ethylene glycol diacrylate, 1,3-butylene glycol diacrylate, 1,4-butane diol diacrylate, 1,5-pentane diol diacrylate, 1,6-hexane diol diacrylate, neopentyl glycol diacrylate, ethylene glycol dimethacrylate, 1,3-butylene glycol dimethacrylate, 1,4-butane diol dimethacrylate, 1,5-pentane diol dimethacrylate, 1,6-hexane diol dimethacrylate and neopentyl glycol dimethacrylate. The content of the crosslinkable monomer in the polymer can be approximately 0.5 mass % to 5.0 mass %.

Styrene-based monomers, acrylic acid ester-based monomers and methacrylic acid ester-based monomers can be given as preferred examples of the polymerizable monomers listed above. A combination of styrene and n-butyl acrylate is preferred. In addition, it is possible to control the number average diameter of domains containing the second resin that is an amorphous resin by adjusting the number of carbon atoms in an alkyl group bonded to an ester moiety of an acrylic acid ester-based monomer or methacrylic acid ester-based monomer.

In cases where this number of carbon atoms is high (for example, a case where the number of carbon atoms in an alkyl group bonded to an ester moiety is at least 8, such as n-octyl acrylate or dodecyl acrylate), interactions with the first monomer unit present in the crystalline resin become stronger and compatibility with this monomer unit increases. As a result, the number average diameter of the domains tends to decrease, and in an opposite case in which the number of carbon atoms is low, the number average diameter of the domains tends to increase.

The second resin that is an amorphous resin preferably has a monomer unit represented by formula (5) below. In cases where the second resin has a monomer unit represented by formula (5) below, the content ratio of the monomer unit represented by formula (5) below in the second resin is preferably at least 30.0 mass %, at least 50.0 mass % or at least 70.0 mass %, and is preferably not more than 95.0 mass % or not more than 90.0 mass %.

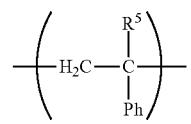

In formula (5), $R^5$ denotes a hydrogen atom or a methyl group, and Ph denotes a phenyl group. The phenyl group may have a substituent group.

By having a phenyl group, the monomer unit represented by formula (5) improves charge maintaining properties in high temperature high humidity environments in particular.

In addition, in cases where both the second resin and the first resin contain a monomer unit represented by formula (5) above, interactions derived from π-electrons tend to occur between phenyl groups contained in the first resin and the second resin. As a result, it is easier to control the number average diameter of the domains within the numerical range mentioned above. Furthermore, charge maintaining properties in high temperature high humidity environments are further improved.

The vinyl-based resin may be produced using a polymerization initiator. From the perspective of efficiency, the polymerization initiator can be used at an amount from 0.05 parts by mass to 10 parts by mass relative to 100 parts by mass of polymerizable monomers.

Examples of the polymerization initiator include the types listed below.

2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobisisobutyrate, 1,1'-azobis(1-cyclohexanecarbonitrile), 2-carbamoylazoisobutyronitrile, 2,2'-azobis(2,4,4-trimethylpentane), 2-phenylazo-2,4-dimethyl-4-methoxyvaleronitrile, 2,2'-azobis(2-methylpropane), ketone peroxides such as methyl ethyl ketone peroxide, acetylacetone peroxide and cyclohexanone peroxide, 2,2-bis(tert-butylperoxy)butane, tert-butyl hydroperoxide, cumene hydroperoxide, 1,1,3,3-tetramethylbutyl hydroperoxide, di-tert-butyl peroxide, tert-butylcumyl peroxide, dicumyl peroxide, α,α'-bis(tert-butylperoxyisopropyl)benzene, isobutyl peroxide, octanoyl peroxide, decanoyl peroxide, lauroyl peroxide, 3,5,5-trimethylhexanoyl peroxide, benzoyl peroxide, m-toluoyl peroxide, diisopropyl peroxydicarbonate, di-2-ethylhexyl peroxydicarbonate, di-n-propyl peroxydicarbonate, di-2-ethoxyethyl peroxycarbonate, dimethoxyisopropyl peroxydicarbonate, di(3-methyl-3-methoxybutyl) peroxycarbonate, acetylcyclohexylsulfonyl peroxide, tert-butyl peroxyacetate, tert-butyl peroxyisobutyrate, tert-butyl peroxyneodecanoate, tert-butylperoxy-2-ethylhexanoate, tert-butyl peroxylaurate, tert-butyl peroxybenzoate, tert-butyl peroxyisopropyl carbonate, di-tert-butyl peroxyisophthalate, tert-butyl peroxyallyl carbonate, tert-amyl peroxy-2-ethylhexanoate, di-tert-butyl peroxyhexahydroterephthalate and di-tert-butyl peroxyazelate.

Polyester resins used in conventional toners can be advantageously used as the polyester resin used for forming the hybrid resin in which a vinyl-based resin and a polyester resin are bound to each other. Examples of monomers able to be used in the polyester resin include polyhydric alcohols (dihydric or at least-trihydric alcohols), polycarboxylic acids (at least-divalent or at least-trivalent carboxylic acids), and acid anhydrides and lower alkyl esters thereof.

Examples of the polyhydric alcohol include the types listed below.

Examples of dihydric alcohols include the bisphenol derivatives listed below.

Polyoxypropylene (2.2)-2,2-bis(4-hydroxyphenyl)propane, polyoxypropylene (3.3)-2,2-bis(4-hydroxyphenyl) propane, polyoxyethylene (2.0)-2,2-bis(4-hydroxyphenyl) propane, polyoxypropylene (2.0)-polyoxyethylene (2.0)-2,2-bis(4-hydroxyphenyl)propane, polyoxypropylene (6)-2,2-bis(4-hydroxyphenyl)propane, and the like.

Examples of other polyhydric alcohols include the types listed below.

ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,4,5-pentanetriol, glycerin, 2-methylpropantriol, 2-methyl-1,2,4-butanetriol, trimethylol ethane, trimethylol propane, 1,3,5-trihydroxymethyl benzene.

It is possible to use one of these polyhydric alcohols in isolation or a plurality of types thereof.

Examples of the polycarboxylic acid include the types listed below.

Examples of dicarboxylic acids include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenyl succinic acid, n-octylsuccinic acid, isooctenylsuccinic acid, isooctylsuccinic acid, and anhydrides and lower alkyl esters of these acids. Of these, maleic acid, fumaric acid, terephthalic acid and n-dodecenylsuccinic acid are preferred.

Examples of at least-trivalent carboxylic acids and acid anhydride and lower alkyl esters thereof include the types listed below.

1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, empol trimer acid, and acid anhydrides and lower alkyl esters of these acids.

Of these, 1,2,4-benzenetricarboxylic acid (trimellitic acid) and derivatives thereof are preferred due to being inexpensive and facilitating reaction control.

It is possible to use one of these polycarboxylic acids in isolation or a plurality of types thereof.

The method for producing the polyester resin is not particularly limited, and a publicly known method can be used. For example, the polyester resin can be produced by simultaneously charging a polyhydric alcohol and polycarboxylic acid mentioned above and then polymerizing by means of an esterification reaction, a transesterification reaction or a condensation reaction. In addition, the polymerization temperature is not particularly limited, but preferably falls within the range from 180° C. to 290° C. When polymerizing the polyester resin, it is possible to use a polymerization catalyst such as a titanium-based catalyst, a tin-based catalyst, zinc acetate, antimony trioxide or germanium dioxide.

The polyester resin used in the amorphous resin is preferably obtained through condensation polymerization using a titanium-based catalyst and/or a tin-based catalyst.

An example of a method for producing a hybrid resin in which a vinyl-based resin and a polyester resin are bound to each other is a method comprising polymerizing using a compound able to react with monomers that produce both resins (hereinafter referred to as a "bireactive compound").

Examples of the bireactive compound include compounds such as fumaric acid, acrylic acid, methacrylic acid, citraconic acid, maleic acid and dimethyl fumarate among monomers of condensation polymerization type resins and monomers of addition polymerization type resins. Of these, fumaric acid, acrylic acid and methacrylic acid can be advantageously used.

From the perspective of improving charging performance in high temperature high humidity environments, the acid value AVi of the second resin that is an amorphous resin is preferably not more than 50.0 mg KOH/g, and more preferably not more than 30.0 mg KOH/g. The lower limit thereof is not particularly limited, but is preferably at least 0 mg KOH/g and, from the perspective of improving charge rising performance, is preferably at least 0.5 mg KOH/g, and more preferably at least 1.0 mg KOH/g.

From the perspective of improving charging performance in high temperature high humidity environments, the hydroxyl value OHVi of the second resin that is an amorphous resin is preferably not more than 50.0 mg KOH/g, and more preferably not more than 30.0 mg KOH/g. The lower limit thereof is not particularly limited, but is preferably at least 0 mg KOH/g and, from the perspective of improving charge rising performance, is preferably at least 0.5 mg KOH/g, and more preferably at least 1.0 mg KOH/g.

If the acid value of the first resin is denoted by AVa and the acid value of the second resin is denoted by AVi, it is preferable for the values of AVa and AVi to satisfy formulae (6) and (7) below from the perspective of improving the scratch resistance of a fixed image. In addition, it is more preferable for the values of AVa and AVi to satisfy formulae (6)' and (7)' below.

$$0.5 \text{ mg KOH/g} \leq \text{AVa} \leq 30.0 \text{ mg KOH/g} \quad (6)$$

$$1.0 \text{ mg KOH/g} \leq \text{AVa} \leq 25.0 \text{ mg KOH/g} \quad (6)'$$

$$0.5 \text{ mg KOH/g} \leq \text{AVi} \leq 30.0 \text{ mg KOH/g} \quad (7)$$

$$1.0 \text{ mg KOH/g} \leq \text{AVi} \leq 25.0 \text{ mg KOH/g} \quad (7)'$$

A case where the formulae above are satisfied means a case in which, for example, a certain number of carboxyl groups are present in both the first resin that is a crystalline resin and the second resin that is an amorphous resin.

In this case, it is thought that hydrogen bonding is facilitated by carboxyl groups at interfaces between the matrix of the crystalline resin and domains of the amorphous resin. Therefore, it is thought that when a fixed image is scratched, scratch resistance is improved as a result of the toner being unlikely to break at an interface between the matrix and a domain.

If the acid value of the first resin is denoted by AVa and the acid value of the second resin is denoted by AVi, it is preferable for the values of AVa and AVi to satisfy formula (8) below. In addition, it is more preferable for the values of AVa and AVi to satisfy formula (8)' below.

$$0 \text{ mg KOH/g} \leq |\text{AVa}-\text{AVi}| \leq 20.0 \text{ mg KOH/g} \quad (8)$$

$$0 \text{ mg KOH/g} \leq |\text{AVa}-\text{AVi}| \leq 15.0 \text{ mg KOH/g} \quad (8)'$$

If the hydroxyl value of the first resin is denoted by OHVa and the hydroxyl value of the second resin is denoted by OHVi, it is preferable for the values of OHVa and OHVi to satisfy formulae (9) and (10) below from the perspective of improving the scratch resistance of a fixed image. In addition, it is more preferable for the values of OHVa and OHVi to satisfy formulae (9)' and (10)' below.

$$0.5 \text{ mg KOH/g} \leq \text{OHVa} \leq 30.0 \text{ mg KOH/g} \quad (9)$$

$$1.0 \text{ mg KOH/g} \leq \text{OHVa} \leq 24.0 \text{ mg KOH/g} \quad (9)'$$

$$0.5 \text{ mg KOH/g} \leq \text{OHVi} \leq 30.0 \text{ mg KOH/g} \quad (10)$$

$$1.0 \text{ mg KOH/g} \leq \text{OHVi} \leq 24.0 \text{ mg KOH/g} \quad (10)'$$

If the hydroxyl value of the first resin is denoted by OHVa and the hydroxyl value of the second resin is denoted by OHVi, it is preferable for the values of OHVa and OHVi to satisfy formula (11) and (11)' below.

$$0 \text{ mg KOH/g} \leq |\text{OHVa} - \text{OHVi}| \leq 20.0 \text{ mg KOH/g} \quad (11)$$

$$0 \text{ mg KOH/g} \leq |\text{OHVa} - \text{OHVi}| \leq 15.0 \text{ mg KOH/g} \quad (11)'$$

The first resin and the second resin may have an acid value or a hydroxyl value, or both an acid value and a hydroxyl value.

The weight average molecular weight (Mw) of tetrahydrofuran (THF)-soluble matter in the second resin that is an amorphous resin, as measured by gel permeation chromatography (GPC), is preferably from 20,000 to 1,000,000, and more preferably from 50,000 to 150,000. If the weight average molecular weight (Mw) of this THF-soluble matter falls within the range mentioned above, elasticity at temperatures close to room temperature is likely to be maintained.

In addition, from the perspective of hot offset resistance, the softening point of the second resin that is an amorphous resin is preferably at least 100° C., at least 110° C., at least 115° C. or at least 120° C., and is preferably not more than 180° C. or not more than 160° C. For example, in cases where the softening point of the second resin is 120° C. to 160° C., low-temperature fixability and hot offset resistance can be achieved to a higher degree.

The content ratio of tetrahydrofuran (THF)-insoluble matter in the second resin is preferably at least 3 mass % from the perspective of hot offset resistance.

The binder resin may further contain a third resin. The third resin preferably contains a resin to which the first resin and the second resin are bound, and more preferably is a resin to which the first resin and the second resin are bound. In cases where the binder resin contains this third resin, winding resistance is further improved. For example, the third resin preferably has a structure to which the first resin and the second resin are at least partially bound.

Methods of linking the first resin to the second resin include methods of crosslinking by applying a radical reaction initiator to a mixture obtained by melting or fusing the first resin and second resin, and methods of crosslinking using a crosslinking agent having a functional group that reacts with both the first resin and the second resin and the like.

The radical polymerization initiator used in the methods of crosslinking using a radical reaction initiator is not particularly limited, and may be an inorganic peroxide, organic peroxide, azo compound or the like. These radical reaction initiators may also be combined.

When both the first resin and the second resin have carbon-carbon unsaturated bonds, these bonds are cleaved when the first resin and second resin are crosslinked. When either or both of the first resin and second resin have no carbon-carbon unsaturated bonds, the two are crosslinked by extracting hydrogen atoms bonded to carbon atoms contained in the first resin and/or second resin. In this case, the radical reaction initiator is more preferably an organic peroxide having strong hydrogen extraction ability.

The crosslinking agent having a functional group that reacts with both the first resin and the second resin is not particularly limited, and a known agent may be used, such as a crosslinking agent having an epoxy group, a crosslinking agent having an isocyanate groups, a crosslinking agent having an oxazoline group, a crosslinking agent having a carbodiimide group, a crosslinking agent having a hydrazide group, a crosslinking agent having an aziridine group or the like.

In methods of crosslinking using a crosslinking agent having a functional group that reacts with both the first resin and the second resin, both the first and second resin must have functional groups that react with the crosslinking agent.

A resin in which at least parts of the first resin and second resin crosslinked by the above method are linked together (that is, a resin composition containing the first resin and the second resin, and a third resin obtained by crosslinking the first and second resin) may be used to manufacture a toner.

When the toner is manufactured by a melt kneading method, a toner particle containing a resin comprising the first resin linked to the second resin can be manufactured by melt kneading a raw material mixture containing the first and second resin in the presence of the above radical reaction initiator or crosslinking agent.

For example, the third resin is preferably a resin obtained by adding a radical reaction initiator while melt kneading the second resin with the first resin to thereby perform a crosslinking reaction.

When the third resin is manufactured using the first resin and second resin, at least parts of the first resin and second resin link together to form the third resin. This yields a binder resin containing the first resin, the second resin and the third resin.

A binder resin containing the first resin, the second resin and the third resin can also be obtained by linking at least parts of the first resin and second resin. The binder resin can also be obtained by manufacturing the third resin separately and then mixing it with the first resin and second resin.

The content of the third resin in the binder resin is preferably 1.0 mass % to 20.0 mass %, or more preferably from 5.0 mass % to 15.0 mass %.

The radical reaction initiator used for this crosslinking reaction is not particularly limited, and may be an inorganic peroxide, organic peroxide, azo compound or the like. These radical reaction initiators may also be combined.

The inorganic peroxide is not particularly limited, and examples include hydrogen peroxide, ammonium peroxide, potassium peroxide, sodium peroxide and the like.

The organic peroxide is not particularly limited, and examples include benzoyl peroxide, di-t-butyl peroxide, t-butylcumyl peroxide, dicumyl peroxide, α,α-bis(t-butylperoxy)diisopropyl benzene, 2,5-dimethyl-2,5-bis(t-butylperoxy) hexane, di-t-hexyl peroxide, 2,5-dimethyl-2,5-di-t-butylperoxyhexine-3, acetyl peroxide, isobutyryl peroxide, octanoyl peroxide, decanoyl peroxide, lauroyl peroxide, 3,3,5-trimethylhexanoyl peroxide, m-toluyl peroxide, t-butyl peroxyisobutyrate, t-butyl peroxyneodecanoate, cumyl peroxyneodecanoate, t-butyl peroxy-2-ethylhexanoate, t-butylperoxy-3,5,5-trimethylhexanoate, t-butyl peroxylaurate, t-butyl peroxybenzoate, t-butyl peroxyisopropyl monocarbonate, t-butyl peroxyacetate and the like.

The azo compound or diazo compound is not particularly limited, and examples include 2,2'-azobis-(2,4-dimethylvaleronitrile), 2,2'-azobisisobutyronitrile, 1,1'-azobis(cyclohexan-1-carbonitrile), 2,2,'-azobis-4-methoxy-2,4-dimethylvaleronitrile, azobisisobutyronitrile and the like.

Of these, an organic peroxide is desirable because it has high efficiency and does not produce toxic by-products such as cyan compounds.

A radical reaction initiator with high hydrogen extraction ability is desirable because the crosslinking reaction can proceed efficiency with a smaller amount of the initiator, and a radical reaction initiator with high hydrogen extraction ability such as t-butylperoxyisopropyl monocarbonate, benzoyl peroxide, di-t-butyl peroxide, t-butylcumyl peroxide, dicumyl peroxide, α,α-bis(t-butylperoxy)diisopropyl benzene, 2,5-dimethyl-2,5-bis(t-butylperoxy) hexane or di-t-hexylperoxide is even more desirable.

The amount of the radical reaction initiator used is not particularly limited, but is preferably 0.1 to 50 mass parts, or more preferably 0.2 to 5 mass parts per 100 mass parts of the binder resin to be crosslinked.

The peak temperature of an endothermic peak of tetrahydrofuran (THF)-insoluble matter other than inorganic components in the toner, as measured using a differential scanning calorimeter (DSC), preferably occurs at 55° C. to 80° C., and the endothermic amount $\Delta Ht$ of the endothermic peak is preferably 3 J/g to 30 J/g. In cases where the endothermic amount $\Delta Ht$ of the endothermic peak falls within the range mentioned above, winding resistance is further improved.

The endothermic amount $\Delta Ht$ of the endothermic peak is more preferably 6 J/g to 30 J/g.

An example of a method for adjusting the endothermic amount $\Delta Ht$ of the endothermic peak within the range mentioned above is a method comprising adjusting the content of monomer units in the first resin or adjusting the content of the first resin in the binder resin.

In order to improve pigment dispersibility, the binder resin may contain resins other than the first resin, the second resin and the third resin as long as the advantageous effect of the present disclosure is not impaired.

Examples of such resins include those listed below.

Poly(vinyl chloride), phenol resins, natural resin-modified phenol resins, natural resin-modified maleic acid resins, poly(vinyl acetate) resins, silicone resins, polyester resins, polyurethane resins, polyamide resins, furan resins, epoxy resins, xylene resins, poly(vinyl butyral) resins, terpene resins, coumarone-indene resins and petroleum-based resins.

The toner particle may contain a colorant. Examples of the colorant include those listed below.

Examples of black colorants include carbon black; and materials that are colored black through use of yellow colorants, magenta colorants and cyan colorants. The colorant may be a single pigment, but using a colorant obtained by combining a dye and a pigment so as to improve the clarity is preferred from the perspective of full color image quality.

Examples of pigments for magenta toners include C.I. pigment red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. pigment violet 19; and C.I. vat red 1, 2, 10, 13, 15, 23, 29 and 35.

Examples of dyes for magenta toners include C.I. solvent red 1, 3, 8, 23, 24, 25, 27, 30, 49, 81, 82, 83, 84, 100, 109 and 121; C.I. disper red 9; C.I. solvent violet 8, 13, 14, 21, 27; oil-soluble dyes such as C.I. disperse violet 1, and C.I. basic red 1, 2, 9, 12, 13, 14, 15, 17, 18, 22, 23, 24, 27, 29, 32, 34, 35, 36, 37, 38, 39 and 40; and basic dyes such as C.I. basic violet 1, 3, 7, 10, 14, 15, 21, 25, 26, 27 and 28.

Examples of pigments for cyan toners include C.I. pigment blue 2, 3, 15:2, 15:3, 15:4, 16, and 17; C. I. vat blue 6; and C.I. acid blue 45 and copper phthalocyanine pigments having 1 to 5 phthalimidomethyl substituents in the phthalocyanine framework.

Examples of dyes for cyan toners include C.I. solvent blue 70.

Examples of pigments for yellow toners include C.I. pigment yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. vat yellow 1, 3 and 20.

Examples of dyes for yellow toners include C.I. solvent yellow 162.

The content of the colorant is preferably from 0.1 to 30.0 mass parts per 100 mass parts of the binder resin.

The toner particles may contain a wax. Examples of the wax include the types listed below.

Microcrystalline waxes, paraffin waxes and Fischer Tropsch waxes; oxides of hydrocarbon-based waxes, such as oxidized polyethylene waxes, and block copolymers thereof; waxes comprising mainly fatty acid esters, such as carnauba wax; and waxes obtained by partially or wholly deoxidizing fatty acid esters, such as deoxidized carnauba wax.

Further examples include the types listed below.

Saturated linear fatty acids such as palmitic acid, stearic acid, and montanic acid; unsaturated fatty acids such as brashidic acid, eleostearic acid, and parinaric acid; saturated alcohols such as stearyl alcohol, aralkyl alcohol, behenyl alcohol, carnaubyl alcohol, ceryl alcohol, and myricyl alcohol; polyhydric alcohols such as sorbitol; esters of fatty acids such as palmitic acid, stearic acid, behenic acid, and montanic acid with alcohols such as stearyl alcohol, aralkyl alcohol, behenyl alcohol, carnaubyl alcohol, ceryl alcohol, and myricyl alcohol; fatty acid amides such as linoleic acid amide, oleic acid amide and lauric acid amide; saturated fatty acid bisamides such as methylene bis-stearic acid amide, ethylene bis-capric acid amide, ethylene bis-lauric acid amide, and hexamethylene bis-stearic acid amide; unsaturated fatty acid amides such as ethylene bis-oleic acid amide, hexamethylene bis-oleic acid amide, N,N'-dioleyl adipic acid amide, and N,N'-dioleyl sebacic acid amide; aromatic bisamides such as m-xylene bis-stearic acid amide and N,N'-distearyl isophthalic acid amide; aliphatic metal salts such as calcium stearate, calcium laurate, zinc stearate, and magnesium stearate (generally referred to as metal soaps); waxes obtained by grafting vinyl monomers such as styrene and acrylic acid onto aliphatic hydrocarbon waxes; partial esterification products of fatty acids and polyhydric alcohols such as monoglyceride behenate; and methyl ester compounds having a hydroxyl group obtained by hydrogenation of vegetable fats and oils.

The content of the wax is preferably 2.0 to 30.0 mass parts per 100 mass parts of the binder resin.

It is preferable for a first peak and second peak derived from a wax to be present in a temperature differential distribution of an endothermic peak of the toner, as measured using differential scanning calorimetry. In addition, it is preferable for the peak top temperature of the first peak to be at least 70° C., for the second peak to be adjacent to the first peak, for the peak top temperature of the second peak to be higher than the peak top temperature of the first peak, and for the height of a recess between the first peak and the second peak to be greater than 0 W/g. In this case, good characteristics can be achieved in terms of image rubfastness.

A case in which the second peak, which is adjacent to the first peak and has a peak top temperature that is higher than that of the first peak, is present and the height of a recess between the first peak and the second peak is greater than 0 W/g means that a wax which exhibits affinity for the wax of the first peak but has a different melting point therefrom is present. Furthermore, because the peak top temperature of the second peak is higher than the peak top temperature of the first peak, the wax of the second peak, which is used together with the wax of the first peak, has a higher molecular weight and readily undergoes phase separation from the first resin that is a crystalline resin.

That is, because the wax of the second peak acts as a nucleating agent that brings about phase separation, the wax of the first peak is also guided in a direction that leads to phase separation from the first resin, meaning that outmigration of the wax at the time of fixing is better facilitated. As a result, it is thought that the surface of a fixed image is coated with wax, thereby achieving excellent rubfastness.

A toner having a first peak and a second peak derived from waxes can be obtained by using a plurality of waxes having different melting points.

In addition, in order to make the height of the recess between the first peak and the second peak greater than 0 W/g, it is possible to use waxes which have similar compositions or structures and which have a portion in which peak temperature regions overlap when endothermic peaks of single waxes in DSC measurements are compared. For example, examples of hydrocarbon waxes include combinations of hydrocarbon-based waxes having different melting points and combinations of polyethylene waxes and polypropylene waxes. Examples of ester waxes include combinations of ester-based waxes having different melting points.

From the perspective of further improving image rubfastness, the peak top temperature of the first peak is preferably at least 70° C., and more preferably at least 80° C. The peak top temperature of the second peak is preferably at least 80° C., and more preferably at least 90° C.

The toner particle may contain a charge control agent.

As the charge control agent, known ones can be used, but in particular, metal compounds of aromatic carboxylic acids which are colorless, can accelerate the charging speed of the toner and can stably hold a constant charge quantity are preferable.

Examples of negatively charging control agents include metal compounds of salicylic acid, metal compounds of naphthoic acid, metal compounds of dicarboxylic acids, polymeric compounds having a sulfonic acid or a carboxylic acid in a side chain, polymeric compounds having a sulfonic acid salt or a sulfonic acid ester compound in a side chain, polymeric compounds having a carboxylic acid salt or a carboxylic acid ester compound in a side chain, boron compounds, urea compounds, silicon compounds, and calixarenes. The charge control agent may be internally or externally added to the toner particle.

The content of the charge control agent is preferably 0.2 to 10.0 parts by mass relative to 100.0 parts by mass of the binder resin.

The toner may contain an external additive. For example, a toner may be obtained by externally adding the external additive to the toner particle.

Inorganic fine particles such as silica fine particles, titanium oxide fine particles and aluminum oxide fine particles are preferred as the external additive.

Inorganic fine particles having a specific surface area of 50 to 400 $m^2/g$ are preferred as an external additive for improving flowability, and inorganic particles having a specific surface area of 10 to 50 $m^2/g$ are preferred in order to achieve long-term stability.

In order to improve both improved flowability and durability, it is possible to use a combination of types of inorganic fine particles whose specific surface areas fall within the ranges mentioned above.

The content of the external additive is preferably 0.1 to 10.0 parts by mass relative to 100 parts by mass of the toner particle. When mixing the toner particle with the external additive, a publicly known mixer such as a Henschel mixer can be used.

The toner can also be used as a single component developer, but from the perspective of providing stable images over a long period of time, it is preferable for the toner to be used as a two component developer that is mixed with a magnetic carrier in order to further improve dot reproducibility. That is, a two component developer containing a toner and a magnetic carrier is preferred, with the toner being the toner mentioned above.

The magnetic carrier can be an ordinary publicly known carrier, such as an iron powder or a surface-oxidized iron powder; particles of a metal such as iron, lithium, calcium, magnesium, nickel, copper, zinc, cobalt, manganese, chromium or a rare earth element, or particles of alloys or oxides of these metals; a magnetic material such as ferrite; or a magnetic material-dispersed resin carrier (a so-called resin carrier) that contains a magnetic material and a binder resin that holds the magnetic material in a dispersed state.

In cases where the toner is used as a two component developer that is mixed with a magnetic carrier, the content of the toner in the two component developer is preferably 2 mass % to 15 mass %, and more preferably 4 mass % to 13 mass %.

The method for producing the toner particle is not particularly limited, and it is possible to use a conventional publicly known production method, such as a suspension polymerization method, an emulsion aggregation method, a melt kneading method or a dissolution suspension method.

Explanations will now be given using melt kneading methods as examples, but the method for producing the toner particle is not limited to these.

Firstly, in a raw material mixing step, prescribed amounts of the first resin and the second resin or a binder resin that contains the first resin and the second resin and, if necessary, other components such as waxes, colorants and charge control agents, are weighed out as materials that constitute the toner particle, blended and mixed. Examples of the mixing device include a double cone mixer, a V type mixer, a drum type mixer, a supermixer, a Henschel mixer, a Nauta mixer and a Mechano Hybrid (produced by Nippon Coke and Engineering Co., Ltd.).

Next, the mixed materials are melt kneaded so as to disperse the other components in the binder resin containing the first resin and the second resin. In a melt kneading step, a batch type kneader, such as a pressurizing kneader or Banbury mixer, or a continuous type kneader can be used, and single screw and twin screw extruders have become mainstream from the perspective of enabling continuous production. Examples thereof include KTK type twin screw extruders (produced by Kobe Steel Ltd.), TEM type twin screw extruders (produced by Toshiba Machine Co., Ltd.), PCM kneaders (produced by Ikegai Corp.), twin screw extruders (produced by KCK Corp.), co-kneaders (produced by Buss) and Kneadex (produced by Nippon Coke & Engineering Co., Ltd.). Furthermore, a resin composition obtained by melt kneading is rolled using a 2-roll roller or the like, and may be cooled by means of water or the like in a cooling step.

The dispersed state of the first resin and the second resin, the number average diameter of the domains, and the like, can be controlled by adjusting the kneading temperature in the melt kneading step, the screw rotation speed, and the like.

Next, the cooled resin composition is pulverized to a required particle diameter in a pulverizing step. In the pulverizing step, the cooled resin composition can be coarsely pulverized using, for example, a pulverizer such as a crusher, a hammer mill or a feather mill, and then finely pulverized using, for example, a Kryptron system (produced by Kawasaki Heavy Industries, Ltd.), a Super Rotor (produced by Nisshin Engineering Inc.), a Turbo Mill (produced by Turbo Kogyo), or an air jet type fine pulverizer.

Next, toner particles can be obtained by classification by means of a classifier or sieving machine such as an inertial classification type elbow jet (produced by Nittetsu Mining Co., Ltd.), a centrifugal classification type Turboplex (produced by Hosokawa Micron Corporation.), a TSP separator (produced by Hosokawa Micron Corporation.) or a Faculty (produced by Hosokawa Micron Corporation.) if necessary.

In addition, an explanation will now be given of a case in which the toner particle is produced using an emulsification aggregation method.

In the emulsion aggregation method, toner particles are produced through a dispersion step of preparing a fine particle-dispersed solution consisting of the constituent material of the toner particles, an aggregation step of aggregating the fine particles consisting of the constituent material of the toner particles, and controlling the particle diameter until the particle diameter of the toner particles is obtained, a fusion step of fusing the resin contained in the obtained aggregated particles, a subsequent cooling step, a metal removal step of filtering off the obtained toner and removing excess multivalent metal ions, a filtration and washing step of washing with ion exchanged water or the like, and a step of removing moisture of the washed toner particles and drying.

Step for Preparing Resin Fine Particle-Dispersed Solution (Dispersion Step)

The resin fine particle-dispersed solution can be prepared by known methods, but is not limited to these methods. Examples of the known methods include an emulsion polymerization method, a self-emulsification method, a phase inversion emulsification method of emulsifying a resin by adding an aqueous medium to a resin solution obtained by dissolving the resin in an organic solvent, and a forced emulsification method in which the resin is forcedly emulsified by high-temperature treatment in an aqueous medium, without using an organic solvent.

Specifically, the first resin and the second resin are dissolved in organic solvents in which these resins dissolve, and a surfactant or a basic compound is added if necessary. In such cases, if the resin is a crystalline resin having a melting point, the resin may be dissolved after being heated to at least the melting point thereof. Next, resin fine particles are precipitated by slowly adding an aqueous medium while agitating by means of a homogenizer or the like. A resin fine particle-dispersed aqueous solution is then prepared by heating or lowering the pressure so as to remove the solvent.

Any organic solvent that can dissolve the resin can be used as the organic solvent for dissolving the resin, but an organic solvent which forms a homogeneous phase with water, such as toluene, is preferable from the viewpoint of suppressing the generation of coarse powder.

The type of surfactant is not particularly limited, but examples thereof include anionic surfactants such as sulfate ester salts, sulfonic acid salts, carboxylic acid salts, phosphate esters and soaps; cationic surfactants such as amine salts and quaternary ammonium salts; and non-ionic surfactants such as polyethylene glycol types, adducts of ethylene oxide to alkylphenols, and polyhydric alcohol types. It is possible to use one of these surfactants in isolation, or a combination of at least two types thereof.

Examples of the basic compound include inorganic bases such as sodium hydroxide and potassium hydroxide, and organic bases such as ammonia, triethylamine, trimethylamine, dimethylaminoethanol and diethylaminoethanol. It is possible to use one of these basic compounds in isolation, or a combination of at least two types thereof.

In addition, the 50% particle diameter on a volume basis (D50) of the resin fine particles in the resin fine particle-dispersed aqueous solution is preferably approximately 0.05 to 1.00 µm, and more preferably approximately 0.05 to 0.40 µm. By adjusting the 50% particle diameter (D50) on a volume basis within the range mentioned above, it is easy to obtain a toner particle having a diameter 3 to 10 µm, which is a suitable weight average particle diameter for the toner particle.

Moreover, a dynamic light scattering particle size distribution analyzer (a Nanotrac UPA-EX150 produced by Nikkiso Co., Ltd.) can be used to measure the 50% particle diameter on a volume basis (D50).

Preparation of Colorant Fine Particle-Dispersed Solution

The colorant fine particle-dispersed solution can be prepared by the known methods listed below, but is not limited to these methods.

The colorant fine particle-dispersed solution can be prepared by mixing a colorant, an aqueous medium and a dispersing agent by using a mixer such as a known stirrer, emulsifier, and disperser. The dispersing agent used here may be a known one such as a surfactant and a polymer dispersing agent.

Although any of the surfactant and the polymer dispersing agent can be removed in the washing step described hereinbelow, the surfactant is preferable from the viewpoint of washing efficiency.

Examples of the surfactant include anionic surfactants such as sulfuric acid esters, sulfonic acid salts, carboxylic acid salts, phosphoric acid esters, soaps and the like; cationic surfactants such as amine salts, quaternary ammonium salts and the like; and nonionic surfactants such as polyethylene glycol, alkylphenol ethylene oxide adducts, polyhydric alcohols and the like.

Among these, nonionic surfactants and anionic surfactants are preferable. Moreover, a nonionic surfactant and an anionic surfactant may be used together. The surfactants may be used singly or in combination of two or more thereof. The concentration of the surfactant in the aqueous medium is preferably 0.5% by mass to 5% by mass.

The amount of the colorant fine particles in the colorant fine particle-dispersed solution is not particularly limited, but is preferably 1% by mass to 30% by mass with respect to the total mass of the colorant fine particle-dispersed solution.

In addition, from the viewpoint of dispersibility of the colorant in the finally obtained toner particle, the dispersed particle diameter of the colorant fine particles in the colorant fine particle-dispersed aqueous solution is preferably such that the 50% particle diameter (D50) based on the volume distribution is 0.50 µm or less. Further, for the same reason, it is preferable that the 90% particle size (D90) based on the volume distribution be 2 µm or less. The 50% particle diameter (D50) based on the volume distribution of the colorant particles dispersed in the aqueous medium may be measured by a dynamic light scattering type particle size distribution analyzer (NANOTRAC UPA-EX150: manufactured by Nikkiso Co., Ltd.).

Known mixers such as stirrers, emulsifiers, and dispersers used for dispersing colorants in aqueous media include ultrasonic homogenizers, jet mills, pressure homogenizers, colloid mills, ball mills, sand mills, and paint shakers. These may be used singly or in combination.

Preparation of Wax Fine Particle-Dispersed Solution

A wax fine particle-dispersed solution can be prepared using the publicly known method given below, but is not limited to this publicly known method.

The wax fine particle-dispersed solution can be prepared by adding a wax to an aqueous medium containing a surfactant, heating to a temperature that is not lower than the melting point of the wax, dispersing in a particulate state using a homogenizer having a strong shearing capacity (for example, a "Clearmix W-Motion" produced by M Technique Co., Ltd.) or a pressure discharge type dispersing machine (for example, a "Gaulin homogenizer" produced by Gaulin), and then cooling to a temperature that is lower than the melting point of the wax.

In addition, the dispersed particle diameter of the wax fine particles in the wax fine particle-dispersed solution is such that the 50% particle diameter on a volume basis (D50) is preferably approximately 0.03 to 1.0 µm, and more preferably approximately 0.10 to 0.50 µm. In addition, it is preferable for coarse wax particles having diameters of at least 1 µm not to be present.

If the dispersed particle diameter in the wax fine particle-dispersed solution falls within the range mentioned above, the wax can be finely dispersed in the toner particle, an outmigration effect can be exhibited to the maximum possible extent at the time of fixing, and good separation properties can be achieved. Moreover, the 50% particle diameter on a volume basis (D50) of the wax fine particle-dispersed solution dispersed in the aqueous medium can be measured using a dynamic light scattering particle size distribution analyzer (a Nanotrac UPA-EX150 produced by Nikkiso Co., Ltd.).

Mixing Step

In the mixing step, a mixed liquid is prepared by mixing the first resin fine particle-dispersed solution, the second resin fine particle-dispersed solution and, if necessary, the wax fine particle-dispersed solution, the colorant fine particle-dispersed solution, and the like. A publicly known mixing apparatus, such as a homogenizer or a mixer, can be used.

Step for Forming Aggregate Particles (Aggregation Step)

In the aggregation step, fine particles contained in the mixed solution prepared in the mixing step are aggregated so as to form aggregates having the target particle diameter. Here, by adding and mixing a flocculant according to need and applying heat and/or a mechanical force as appropriate, aggregates are formed through aggregation of resin fine particles and, if necessary, wax fine particles, colorant fine particles, and the like.

If necessary, a flocculant that contains an at least-divalent metal ion may be used as the flocculant.

A flocculant that contains an at least-divalent metal ion exhibits high cohesive strength and can achieve the desired objective even when added in a small amount. These flocculants can ionically neutralize ionic surfactants contained in the resin fine particle-dispersed solution, the wax fine particle-dispersed solution and the colorant fine particle-dispersed solution. As a result of a salting out and ion crosslinking effect, resin fine particles, wax fine particles and colorant fine particles are easily aggregated.

The aggregation step is a step in which toner particle-sized aggregates are formed in the aqueous medium. The weight average particle diameter of aggregates produced in the aggregation step is preferably 3 to 10 µm. Moreover, this weight average particle diameter can be measured using a particle size distribution analyzer that uses the Coulter principle (a Coulter Multisizer III: produced by Beckman Coulter, Inc.).

Fusion Step

In the fusion step, an aggregation-stopping agent may be added to a dispersed solution containing the aggregates obtained in the aggregation step while agitating in the same way as in the aggregation step. Examples of aggregation-stopping agents include basic compounds which shift the equilibrium of acidic polar groups in the surfactant to the dissociation side and stabilize aggregated particles. Other examples include chelating agents, which partially dissociate ionic crosslinks between acidic polar groups in the surfactant and metal ions which are the flocculent and form coordination bonds with the metal ions, thereby stabilizing aggregated particles.

After the dispersed state of aggregated particles in the dispersed solution has stabilized as a result of the action of the aggregation-stopping agent, the aggregated particles can be fused by being heated to a temperature that is not lower than the glass transition temperature or melting point of the binder resin.

The number average diameter of the domains can be controlled by adjusting the temperature in the fusion step. The weight average particle diameter of the obtained toner particles is preferably approximately 3 to 10 µm.

Filtration Step, Washing Step, Drying Step and Classification Step

Next, toner particles can be obtained by subjecting toner particle solids to a filtration step and, if necessary, a washing step, a drying step and a classification step for adjusting particle size.

Obtained toner particles may be used as-is as a toner. A toner may be obtained by mixing obtained toner particles with inorganic fine particles and, if necessary, other external additives. The toner particles, inorganic fine particles and other external additives can be mixed using a mixing device such as a double cone mixer, a V type mixer, a drum type mixer, a supermixer, a Henschel mixer, a Nauta mixer, a Mechano Hybrid (produced by Nippon Coke and Engineering Co., Ltd.) or a Nobilta (produced by Hosokawa Micron Corporation.).

Explanations will now be given of methods for measuring a variety of physical properties of the toner and raw materials.

Toner Cross Section Observations, Domain-Matrix Structure, and Measurement of Number Average Diameter of Domains Firstly, flakes serving as an abundance standard sample are prepared.

A first resin that is a crystalline resin is thoroughly dispersed in a visible light-curable resin (Aronix LCR series D800), and curing is then carried out by irradiating with short wavelength light. A flaky sample measuring 250 nm is produced by cutting the obtained cured product using an ultramicrotome equipped with a diamond knife. A flaky sample of a second resin that is an amorphous resin is prepared in the same way.

Next, kneaded products are prepared by mixing and melt kneading the first resin and the second resin at mass ratios of 0/100, 30/70, 70/30 and 0/100. Flaky samples are then produced in the same way by dispersing these kneaded products in a visible light-curable resin, curing and cutting.

Next, cross sections of these cut standard samples are observed using a transmission electron microscope (a JEM-2800 electron microscope produced by JEOL Ltd.) (TEM-EDX), and element mapping is carried out using EDX. Elements to be mapped are carbon, oxygen and nitrogen.

Mapping conditions are as follows.

Accelerating voltage: 200 kV
Electron beam irradiation size: 1.5 nm
Live time limit: 600 sec
Dead time: 20 to 30
Mapping resolution: 256×256

Based on the spectral intensity of the elements (average values for a 10 nm square area), the values of (oxygen element intensity/carbon element intensity) and (nitrogen element intensity/carbon element intensity) are calculated, and calibration curves are prepared for the mass ratio of the first resin and the second resin. In cases where monomer units in the first resin contain nitrogen atoms, subsequent quantitative determination is carried out using the (nitrogen element intensity/carbon element intensity) calibration curve. A toner sample is then analyzed.

A toner is thoroughly dispersed in a visible light-curable resin (Aronix LCR series D800), and curing is then carried out by irradiating with short wavelength light. A thin sample measuring 250 nm is produced by cutting the obtained cured product using an ultramicrotome equipped with a diamond knife.

Next, the cut sample is then observed using a transmission electron microscope (TEM-EDX) (a JEM-2800 electron microscope produced by JEOL Ltd.). A cross section image of the toner particle is acquired, and element mapping is carried out using EDX. Elements to be mapped are carbon, oxygen and nitrogen.

Moreover, the toner cross section to be observed is selected in the manner described below. First, the toner cross section area is determined from the toner cross section image, and the diameter (circle-equivalent diameter) of a circle having the same area as this cross section area is determined. Observations are carried out using only toner cross section images in which the absolute value of the difference between this circle-equivalent diameter and the weight average particle diameter (D4) of the toner is within 1.0 μm.

For domains confirmed by observed images, the values of (oxygen element intensity/carbon element intensity) and/or (nitrogen element intensity/carbon element intensity) are calculated based on the spectral intensity of the elements (average values for a 10 nm square area), and calibration curves are prepared for the mass ratio of the first resin and the ratio of the second resin is calculated by comparing with the calibration curves mentioned above. A domain in which the proportion of the second resin is at least 80% is deemed to be a domain in the present disclosure.

After specifying domains confirmed by observed images, the particle diameter of domains present in the toner cross section image is determined by binarization. The particle diameter is taken to be the long axis of the domain. This is measured at 10 points per toner, and the arithmetic mean value of the domain diameters of 10 toners is taken to be the number average diameter (μm) of the domains.

Meanwhile, the domain area is determined by totaling the areas of all domains present in a toner cross section image so as to obtain the total area, and this is denoted by S1. This is measured at 10 points per toner, the total area of domains in 10 toners (that is, S1+S2 . . . +S100) is calculated, and the arithmetic mean value thereof is taken to be the "domain area".

The toner cross section area is determined by obtaining the total cross section area of toners (10 points per toner, and 10 toners), as determined from the toner cross section images used when determining the domain areas, and the arithmetic mean value thereof is taken to be the "toner cross section area". In addition, the value of [domain area]/[toner cross section area]×100 is taken to be the ratio of domain area relative to toner cross section area (domain areal ratio (%)).

Moreover, binarization and number average diameter calculations were performed using Image Pro PLUS (produced by Nippon Roper K. K.).

Method for Separating Materials from Toner

Materials contained in the toner can be separated from the toner by utilizing differences in solubility in solvents of the materials.

First separation: A toner is dissolved in methyl ethyl ketone (MEK) at 23° C., and soluble matter (the second resin) and insoluble matter (the first resin, wax, colorant, inorganic fine particles, and the like) are separated.

Second separation: Insoluble matter obtained through the first separation (the first resin, wax, colorant, inorganic fine particles, and the like) is dissolved in MEK at 100° C., and soluble matter (the first resin, wax) and insoluble matter (colorant, inorganic fine particles, and the like) are separated.

Third separation: Soluble matter obtained through the second separation (the first resin, wax) is dissolved in chloroform at 23° C., and soluble matter (the first resin) and insoluble matter (the wax) are separated.

Case Where Third Resin is Contained

First separation: A toner is dissolved in methyl ethyl ketone (MEK) at 23° C., and soluble matter (the second resin and third resin) and insoluble matter (the first resin, wax, colorant, inorganic fine particles, and the like) are separated.

Second separation: Soluble matter obtained through the first separation (the second resin and third resin) are dissolved in toluene at 23° C., and soluble matter (the third resin) and insoluble matter (the second resin) are separated.

Third separation: Insoluble matter obtained through the first separation (the first resin, wax, colorant, inorganic fine particles, and the like) is dissolved in MEK at 100° C., and soluble matter (the first resin, wax) and insoluble matter (colorant, inorganic fine particles, and the like) are separated.

Fourth separation: Soluble matter obtained through the third separation (the first resin, wax) is dissolved in chloroform at 23° C., and soluble matter (the first resin) and insoluble matter (the wax) are separated.

Measurement of Content of First Resin and Second Resin in Binder Resin in Toner

The content of the first resin and that of the second resin in the binder resin in the toner are calculated by measuring the mass of soluble matter and insoluble matter separated in the separation steps mentioned above.

Methods for Identifying and Measuring Content Ratios of Monomer Units Constituting First, Second and Third Resins Methods for identifying and measuring the content ratios of the monomer units that constitute the first, second and third resins are carried out by $^1$H-NMR under the conditions described below.

- Measurement apparatus: FT NMR apparatus—JNM-EX400 (produced by JEOL Ltd.)
- Measurement frequency: 400 MHz
- Pulse conditions: 5.0 μs
- Frequency range: 10,500 Hz
- Number of accumulations: 64
- Measurement temperature: 30° C.
- Sample: 50 mg of a measurement sample is placed in a sample tube having an internal diameter of 5 mm, deuterated chloroform ($CDCl_3$) is added as a solvent, and the measurement sample is dissolved in a constant temperature bath at 40° C. From among peaks attributable to constituent elements of the first monomer unit in an obtained $^1$H-NMR chart, a peak that is independent from peaks attributable to constituent elements of other monomer units is selected, and the integrated value $S_1$ of this peak is calculated.

Similarly, from among peaks attributable to constituent elements of the second monomer unit, a peak that is independent from peaks attributable to constituent elements of other monomer units is selected, and the integrated value $S_2$ of this peak is calculated.

Furthermore, in cases where a third monomer unit is contained, from among peaks attributable to constituent elements of the third monomer unit, a peak that is independent from peaks attributable to constituent elements of other monomer units is selected, and the integrated value $S_3$ of this peak is calculated.

The content ratio of the first monomer unit is calculated in the manner described below using the integrated values $S_1$, $S_2$ and $S_3$. Moreover, $n_1$, $n_2$ and $n_3$ denote the number of hydrogens in constituent elements attributable to peaks observed for the respective segments.

Content ratio of first monomer unit (mol %)={$(S_1/n_1)/((S_1/n_1)+(S_2/n_2)+(S_3/n_3))$}×100

Similarly, the content ratios of the second monomer unit and the third monomer unit are determined in the manner shown below.

Content ratio of second monomer unit (mol %)={$(S_2/n_2)/((S_1/n_1)+(S_2/n_2)+(S_3/n_3))$}×100

Content ratio of third monomer unit (mol %)={$(S_3/n_3)/((S_1/n_1)+(S_2/n_2)+(S_3/n_3))$}×100

For example, in cases where a polymerizable monomer in which a hydrogen atom is not contained in constituent elements other than vinyl groups is used in the first, second and third resins, $^{13}$C-NMR measurements are carried out in single pulse mode using $^{13}$C as a measurement atomic nucleus, and calculations are carried out in the same way as in $^1$H-NMR measurements.

Method for Calculating SP Value

SP values are determined in the manner described below in accordance with the calculation method proposed by Fedors.

For each of the polymerizable monomers, the evaporation energy ($\Delta ei$) (cal/mol) and molar volume ($\Delta vi$) ($cm^3$/mol) of atoms and atomic groups in the molecular structure are determined from tables shown in "Polym. Eng. Sci., 14(2), 147-154 (1974)", and $(4.184 \times \Sigma\Delta ei/\Sigma\Delta vi)^{0.5}$ is taken to be the SP value $(J/cm^3)^{0.5}$.

For example, the value of $SP_{21}$ is calculated using a calculation method similar to that described above for atoms and atomic groups in a molecular structure in which a double bond in a polymerizable monomer is cleaved by polymerization. That is, the value of $SP_{21}$ can be determined by dividing the evaporation energy of a monomer unit by the molar volume.

Method for Measuring Weight Average Molecular Weight (Mw) of Resin or the like Using Gel Permeation Chromatography (GPC)

The weight average molecular weight (Mw) of tetrahydrofuran (THF)-soluble matter in a resin or the like is measured using gel permeation chromatography (GPC), in the manner described below.

First, a resin or the like is dissolved in tetrahydrofuran (THF) at room temperature over a period of 24 hours. A sample solution is then obtained by filtering the obtained solution using a solvent-resistant membrane filter having a pore diameter of 0.2 μm (a "Mishoridisk" (pretreatment disk) produced by Tosoh Corporation). Moreover, the sample solution is prepared so that the concentration of THF-soluble components is approximately 0.8 mass %. Measurements are carried out using this sample solution under the following conditions.

- Apparatus: HLC8120 GPC (detector: RI) (produced by Tosoh Corporation)
- Column: Combination of Shodex KF-801, 802, 803, 804, 805, 806 and 807 (produced by Showa Denko K. K.)
- Eluant: Tetrahydrofuran (THF)
- Flow rate: 1.0 mL/min
- Oven temperature: 40.0° C.
- Injected amount: 0.10 mL When calculating the molecular weight of the sample, a molecular weight calibration curve is prepared using standard polystyrene resins (product names "TSK Standard Polystyrene F-850, F-450, F-288, F-128, F-80, F-40, F-20, F-10, F-4, F-2, F-1, A-5000, A-2500, A-1000 and A-500", produced by Tosoh Corporation).

Methods for Measuring Melting Point of Toner, Resin, or the like, Endothermic Peak and Endothermic Amount, and Peak Temperature of Wax in Temperature Differential Distribution The melting point of a toner, resin, or the like, and endothermic peaks and endothermic amounts are measured using a DSC Q1000 (produced by TA Instruments) under the following conditions.

- Temperature increase rate: 10° C./min
- Measurement start temperature: 20° C.
- Measurement end temperature: 180° C.

Temperature calibration of the detector in the apparatus is performed using the melting points of indium and zinc, and heat amount calibration is performed using the heat of fusion of indium.

Specifically, approximately 5 mg of a sample is weighed out, placed in an aluminum pan, and subjected to differential scanning calorimetric measurements. An empty silver pan is used as a reference.

The melting point is taken to be the peak temperature of the maximum endothermic peak in a first temperature increase step.

Moreover, in cases where there are multiple peaks, the maximum endothermic peak is taken to be the peak for which the endothermic amount is greatest. Furthermore, the endothermic amount of this maximum endothermic peak is determined.

In cases where a toner is used as a sample, the peak top temperatures of a first peak and a second peak derived from waxes are calculated from a curve in which a temperature-endothermic amount curve is differentiated by temperature within the temperature range of 30° C. to 140° C. In addition, the height of the recess between the first peak and the second peak is also calculated.

Confirmation of Whether or Not the First Peak and Second Peak are Derived from Waxes By confirming the peak top temperatures in a temperature differential distribution of endothermic peaks, as measured by DSC, of insoluble matter (wax) obtained using the separation method mentioned above, it can be assessed whether or not the first peak and the second peak are derived from waxes.

Moreover, tetrahydrofuran (THF)-insoluble matter other than inorganic components in the toner can be prepared in the manner described below.

Method for Measuring Tetrahydrofuran (THF)-Insoluble Matter Other than Inorganic Components in Toner 1.5 g of a toner for measuring THF-insoluble matter (0.7 g in cases where THF-insoluble matter in a single resin is to be measured) is precisely weighed out (W1 g), and placed in a cylindrical filter paper that has been precisely weighed in advance (product name: No. 86R, size: 28×100 mm, produced by Advantec Toyo Kaisha, Ltd.), and then placed in a Soxhlet extraction device. Extraction is carried out for 18 hours using 200 mL of tetrahydrofuran (THF) as a solvent, and extraction is carried out at a circulation rate such that solvent extraction cycle lasts for approximately five minutes.

Following completion of the extraction, the cylindrical filter paper is removed, air dried, and then vacuum dried for eight hours at 40° C., after which the mass of the cylindrical filter paper, including extraction residue, is weight, and the mass of extraction residue (W2 g) is calculated by subtracting the mass of the cylindrical filter paper.

Next, the content of inorganic components (W3 g) is determined using the following procedure (in cases where THF-insoluble matter in a single resin is to be measured, the value of W3 is taken to be 0 g).

Approximately 2 g of toner (Wag) is precisely weighed out into a 30 mL magnetic crucible that has been precisely weighed in advance.

The magnetic crucible is placed in an electric oven and heated for approximately three hours at a temperature of approximately 900° C., allowed to gradually cool in the electric oven, and then allowed to gradually cool for at least one hour at normal temperature in a desiccator, after which the mass of the crucible, including incineration ash content, is precisely weighed, and the incineration ash content (Wbg) is calculated by subtracting the mass of the crucible.

Next, the incineration ash content (W3 g) in the sample W1 g is calculated using formula (A) below.

$$W3 = W1 \times (Wb/Wa) \quad (A)$$

In this case, the amount of THF-insoluble matter is determined using formula (B) below.

$$\text{THF-Insoluble matter (mass \%)} = \{(W2-W3)/(W1-W3)\} \times 100 \quad (B)$$

In addition, THF-soluble matter can be recovered by thoroughly distilling off THF from THF-soluble components using an evaporator.

Method for Measuring Acid Value

Acid value is the number of milligrams of potassium hydroxide required to neutralize acid contained in 1 g of a sample. Acid value is measured in accordance with JIS K 0070-1992, but is specifically measured using the following procedure.

(1) Reagent Preparation

A phenolphthalein solution is obtained by dissolving 1.0 g of phenolphthalein in 90 mL of ethyl alcohol (95 vol. %) and adding ion exchanged water up to a volume of 100 mL.

7 g of special grade potassium hydroxide is dissolved in 5 mL of water, and ethyl alcohol (95 vol. %) is added up to a volume of 1 L. A potassium hydroxide solution is obtained by placing the obtained solution in an alkali-resistant container so as not to be in contact with carbon dioxide gas or the like, allowing solution to stand for three days, and then filtering. The obtained potassium hydroxide solution is stored in the alkali-resistant container. The factor of the potassium hydroxide solution is determined by placing 25 mL of 0.1 mol/L hydrochloric acid in a conical flask, adding several drops of the phenolphthalein solution, titrating with the potassium hydroxide solution, and determining the factor from the amount of the potassium hydroxide solution required for neutralization. The 0.1 mol/L hydrochloric acid is produced in accordance with JIS K 8001-1998.

(2) Operation (A) Main Test 2.0 g of a pulverized sample is measured precisely into a 200 mL conical flask, 100 mL of a mixed toluene/ethanol (2:1) solution is added, and the sample is dissolved over a period of five hours. Next, several drops of the phenolphthalein solution are added as an indicator, and titration is carried out using the potassium hydroxide solution. Moreover, the endpoint of the titration is deemed to be the point when the pale crimson color of the indicator is maintained for approximately 30 seconds.

(B) Blank Test

Titration is carried out in the same way as in the operation described above, except that the sample is not used (that is, only a mixed toluene/ethanol (2:1) solution is used).

(3) The Acid Value is Calculated by Inputting the Obtained Results into the Formula Below.

$$A = [(C-B) \times f \times 5.61]/S$$

Here, A denotes the acid value (mg KOH/g), B denotes the added amount (mL) of the potassium hydroxide solution in the blank test, C denotes the added amount (mL) of the potassium hydroxide solution in the main test, f denotes the factor of the potassium hydroxide solution, and S denotes the mass (g) of the sample.

Method for Measuring Hydroxyl Value

Hydroxyl value is the number of milligrams of potassium hydroxide required to neutralize acetic acid that bonds to hydroxyl groups when of 1 g of a sample is acetylated. Hydroxyl value is measured in accordance with JIS-K0070-1992, but is specifically measured using the following procedure.

(1) Reagent Preparation

An acetylation reagent is obtained by placing 25 g of special grade acetic anhydride in a 100 mL volumetric flask, adding pyridine up to a total amount of 100 mL, and thoroughly shaking. The obtained acetylation reagent is stored in a brown bottle so as not to be in contact with moisture, carbon dioxide gas, and the like.

A phenolphthalein solution is obtained by dissolving 1.0 g of phenolphthalein in 90 mL of ethyl alcohol (95 vol. %) and adding ion exchanged water up to a volume of 100 mL.

35 g of special grade potassium hydroxide is dissolved in 20 mL of water, and ethyl alcohol (95 vol. %) is added up to a volume of 1 L. A potassium hydroxide solution is obtained by placing the obtained solution in an alkali-resistant container so as not to be in contact with carbon dioxide gas or the like, allowing solution to stand for three days, and then filtering. The obtained potassium hydroxide solution is stored in the alkali-resistant container. The factor of the potassium hydroxide solution is determined by placing 25 mL of 0.5 mol/L hydrochloric acid in a conical flask, adding several drops of the phenolphthalein solution, titrating with the potassium hydroxide solution, and determining the factor from the amount of the potassium hydroxide solution required for neutralization. The 0.5 mol/L hydrochloric acid is produced in accordance with JIS-K8001-1998.

(2) Operation
(A) Main Test 1.0 g of a pulverized sample is precisely weighed out into a 200 mL round bottomed flask, and 5.0 mL of the acetylation reagent is precisely added to the flask using a transfer pipette. If the sample hardly dissolves in the acetylation reagent during this process, dissolution is achieved by adding a small amount of special grade toluene.

A small funnel is placed on the mouth of the flask, and approximately the bottom of 1 cm of the flask is heated by being immersed in a glycerin bath at approximately 97° C. At this point, it is preferable to cover the base of the neck of the flask with a thick paper having a round hole therein in order to prevent the neck of the flask from increasing in temperature by taking on heat from the bath.

After one hour, the flask is removed from the glycerin bath and left to cool. Following the cooling, 1 mL of water is added from a funnel, and the flask is then shaken to hydrolyze the acetic anhydride. In order to achieve complete hydrolysis, the flask is again heated for 10 minutes using a glycerin bath. After allowing the flask to cool, the funnel and the walls of the flask are washed with 5 mL of ethyl alcohol.

Several drops of the phenolphthalein solution are added as an indicator, and titration is carried out using the potassium hydroxide solution. Moreover, the endpoint of the titration is deemed to be the point when the pale crimson color of the indicator is maintained for approximately 30 seconds.

(B) Blank Test

Titration is carried out using a procedure similar to that described above, except that a sample is not used.

(3) The Hydroxyl Value is Calculated by Inputting the Obtained Results into the Formula Below.

$$A=[\{(B-C) \times 28.05 \times f\}/S]+D$$

Here, A denotes the hydroxyl value (mg KOH/g), B denotes the added amount (mL) of the potassium hydroxide solution in the blank test, C denotes the added amount (mL) of the potassium hydroxide solution in the main test, f denotes the factor of the potassium hydroxide solution, S denotes the mass (g) of the sample, and D denotes the acid value (mg KOH/g) of the sample.

Method for Measuring Softening Point (Tm) of Resin

The softening point of the resin is measured using a constant load extrusion type capillary rheometer "Flow Tester CFT-500D Flow Characteristics Analyzer" (produced by Shimadzu Corporation), with the measurements being carried out in accordance with the manual provided with the apparatus. In this apparatus, the temperature of a measurement sample filled in a cylinder is increased while a constant load is applied from above by means of a piston, thereby melting the sample, the molten measurement sample is extruded through a die at the bottom of the piston, and a flow curve can be obtained from the amount of piston travel and the temperature during this process.

In addition, the softening temperature was taken to be the "melting temperature by the half method" described in the manual provided with the "Flow Tester CFT-500D Flow Characteristics Analyzer". Moreover, the melting temperature in the half method is calculated as follows.

First, half of the difference between the amount of piston travel at the completion of outflow (outflow completion point; denoted by Smax) and the amount of piston travel at the start of outflow (minimum point; denoted by Smin) is determined (this is designated as X. X=(Smax−Smin)/2). Next, the temperature in the flow curve when the amount of piston travel reaches the sum of X and Smin is taken to be the melting temperature by the half method.

The measurement sample is prepared by subjecting approximately 1.0 g of a resin to compression molding for approximately 60 seconds at approximately 10 MPa in a 25° C. environment using a tablet compression molder (for example, a Standard Manual Newton Press NT-100H produced by NPa System Co., Ltd.) to provide a cylindrical shape with a diameter of approximately 8 mm.

The specific measurement procedure is carried out in accordance with the manual provided with the apparatus.

The measurement conditions for the Flow Tester CFT-500D are as follows.

Test mode: Rising temperature method
Start temperature: 50° C.
End point temperature: 200° C.
Measurement interval: 1.0° C.
Temperature increase rate: 4.0° C./min
Piston cross section area: 1.000 cm$^2$
Test load (piston load): 10.0 kgf (0.9807 MPa)
Preheating time: 300 sec
Diameter of die orifice: 1.0 mm
Die length: 1.0 mm Method for Measuring Weight Average Particle Diameter (D4) of Toner (Particles)

The weight-average particle diameter (D4) of the toner (particle) is calculated by carrying out measurements using a precision particle size distribution measuring device which employees a pore electrical resistance method and uses a 100 μm aperture tube (a "Coulter Counter Multisizer 3" registered trademark produced by Beckman Coulter, Inc) and accompanying dedicated software that is used to set measurement conditions and analyze measured data ("Beckman Coulter Multisizer 3 Version 3.51 produced by Beckman Coulter, Inc.) (no. of effective measurement channels: 25,000), and then analyzing the measurement data.

A solution obtained by dissolving special grade sodium chloride in ion exchanged water at a concentration of approximately 1 mass %, such as "ISOTON II" (produced by Beckman Coulter, Inc.), can be used as an aqueous electrolyte solution used in the measurements.

Moreover, dedicated software was set up as follows before carrying out measurements and analysis.

On the "Standard Operating Method (SOM) alteration screen" in the dedicated software, the total count number in control mode is set to 50,000 particles, the number of measurements is set to 1, and the Kd value is set to "standard particle 10.0 μm" (Beckman Coulter, Inc.). By pressing the threshold value/noise level measurement button, threshold values and noise levels are automatically set. In addition, the current is set to 1600 µA, the gain is set to 2, the electrolyte solution is set to ISOTON II, and the "Flush aperture tube after measurement" option is checked.

On the "Screen for converting from pulse to particle diameter" in the dedicated software, the bin interval is set to logarithmic particle diameter, the particle diameter bin is set to 256 particle diameter bin, and the particle diameter range is set to from 2 µm to 60 µm.

The specific measurement method is as follows.

(1) 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

(2) 30 mL of the aqueous electrolyte solution is placed in a 100 mL glass flat bottomed beaker, and approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, produced by Wako Pure Chemical Industries, Ltd.) 3-fold with ion exchanged water, is added to the beaker as a dispersant.

(3) A prescribed amount of ion exchanged water is placed in a water bath of an "Ultrasonic Dispersion System Tetora 150" (produced by Nikkaki Bios Co., Ltd.) having an electrical output of 120 W, in which 2 oscillators having an oscillation frequency of 50 kHz are housed so that their phases are staggered by 180°, and approximately 2 mL of the Contaminon N is added to the water bath.

(4) The beaker mentioned in section (2) above is placed in a beaker-fixing hole of the ultrasonic wave disperser, and the ultrasonic wave disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, approximately 10 mg of toner (particles) are added a little at a time to the aqueous electrolyte solution and dispersed therein. The ultrasonic wave dispersion treatment is continued for a further 60 seconds. Moreover, when carrying out the ultrasonic wave dispersion, the temperature of the water bath is adjusted as appropriate to a temperature of from 10° C. to 40° C.

(6) The aqueous electrolyte solution mentioned in section (5) above, in which the toner (particles) are dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.

(7) The weight-average particle diameter (D4) is calculated by analyzing measurement data using the accompanying dedicated software. Moreover, when setting the graph/vol. % with the dedicated software, the "average diameter" on the analysis/volume-based statistical values (arithmetic mean) screen is weight-average particle diameter (D4).

Method for Measuring 50% Particle Diameter on a Volume Basis (D50) of Resin Fine Particles, Wax Fine Particles and Colorant Fine Particles A dynamic light scattering particle size distribution analyzer (Nanotrac UPA-EX150 produced by Nikkiso Co., Ltd.) is used to measure the 50% particle diameter on a volume basis (D50) of the fine particles. Specifically, measurements are carried out using the following procedure.

In order to prevent aggregation of the measurement sample, a dispersed solution obtained by dispersing the measurement sample in an aqueous solution containing Family Fresh (produced by Kao Corporation) is introduced and agitated. Following the agitation, the measurement sample is introduced into the apparatus, after which measurements are carried out twice and the average value is determined.

In terms of measurement conditions, the measurement time is 30 seconds, the refractive index of sample particles is 1.49, the dispersion medium is water, and the refractive index of the dispersion medium is 1.33.

The volume-based particle size distribution of the measurement sample is measured, and from the measurement results, the particle diameter at which the cumulative value from the small particle diameter side reaches 50% in the volume-based particle size distribution is taken to be the 50% particle diameter on a volume basis (D50) of the fine particles.

EXAMPLES

The present disclosure will now be explained in greater detail using the examples given below. However, these examples in no way limit the present disclosure. In the formulations below, "parts" always means parts by mass unless explicitly indicated otherwise.

Production Example of First Resin 1 (Crystalline Resin 1)

| | |
|---|---|
| Solvent (toluene) | 100.0 parts |
| Monomer composition | 100.0 parts |

(The monomer composition is obtained by mixing behenyl acrylate, acrylonitrile, acrylic acid and styrene at the proportions shown below)

| | |
|---|---|
| Behenyl acrylate | 60.0 parts |
| Acrylonitrile | 10.0 parts |
| Acrylic acid | 1.0 part |
| Styrene | 27.5 parts |
| Polymerization initiator | 0.5 parts |

[t-butyl peroxypivalate (Perbutyl PV, produced NOF Corp.)]

In a nitrogen atmosphere, the materials listed above were placed in a reaction vessel equipped with a reflux condenser, a stirrer, a temperature gauge and a nitrogen inlet tube. While being stirred at 200 rpm, the contents of the reaction vessel were heated to 70° C. and a polymerization reaction was carried out for 12 hours, thereby obtaining a solution in which a polymer of the monomer composition was dissolved in toluene.

The temperature of the solution was then lowered to 25° C., and the solution was introduced into 1000.0 parts of methanol under stirring, thereby causing methanol-insoluble matter to precipitate. The thus obtained methanol-insoluble matter was filtered and washed with methanol, and then vacuum dried at 40° C. for 24 hours, thereby obtaining the first resin 1 (crystalline resin 1). The first resin 1 (crystalline resin 1) had a weight average molecular weight (Mw) of 34,000, a melting point (Tp) of 61° C., an acid value of 20.0 mg KOH/g and a hydroxyl value of 0.0 mg KOH/g.

When subjected to NMR analysis, the first resin 1 (crystalline resin 1) contained 20.0 mol % of monomer units derived from behenyl acrylate, 30.9 mol % of monomer units derived from acrylonitrile, 5.7 mol % of monomer units derived from acrylic acid and 43.4 mol % of monomer units derived from styrene. In addition, the SP values (units: $(J/cm^3)^{0.5}$) of monomer units derived from the monomers were calculated.

Production Examples of First Resins 2 to 23
(Crystalline Resins 2 to 23)

First resins 2 to 23 (crystalline resins 2 to 23) were obtained by carrying out a similar reaction to that used in the production example of the first resin 1 (crystalline resin 1), except that the monomers and numbers of parts by mass were altered in the manner shown in Table 1. The results are shown in Table 2 and Table 3.

TABLE 1

| | First polymerizable monomer | | | Second polymerizable monomer | | | Third polymerizable monomer | | |
|---|---|---|---|---|---|---|---|---|---|
| First resin | Type | Parts | mol [%] | Type | Parts | mol [%] | Type | Parts | mol [%] |
| 1 | BEA | 60.0 | 20.0 | AN | 10.0 | 30.9 | St | 27.5 | 43.4 |
| | | | | AA | 1.0 | 5.7 | | | |
| 2 | BEA | 60.0 | 24.3 | VA | 10.0 | 23.2 | St | 29.0 | 49.8 |
| | | | | AA | 1.0 | 2.8 | | | |
| 3 | BEA | 60.0 | 28.9 | AA | 1.0 | 2.5 | St | 39.0 | 68.6 |
| 4 | BEA | 60.0 | 29.1 | HPMA | 0.1 | 0.1 | St | 39.9 | 70.8 |
| 5 | BEA | 60.0 | 29.1 | HPMA | 0.2 | 0.3 | St | 39.8 | 70.6 |
| 6 | BEA | 60.0 | 29.4 | HPMA | 2.0 | 2.6 | St | 38.0 | 68.0 |
| 7 | BEA | 60.0 | 29.4 | HPMA | 2.3 | 3.0 | St | 37.7 | 67.6 |
| 8 | BEA | 60.0 | 29.5 | HPMA | 3.0 | 3.9 | St | 37.0 | 66.6 |
| 9 | BEA | 60.00 | 29.1 | AA | 0.03 | 0.1 | St | 39.97 | 70.8 |
| 10 | BEA | 60.0 | 29.1 | AA | 0.1 | 0.3 | St | 39.9 | 70.7 |
| 11 | BEA | 60.0 | 28.9 | AA | 0.4 | 1.0 | St | 39.6 | 70.1 |
| 12 | BEA | 32.0 | 11.4 | AA | 0.4 | 4.7 | St | 67.6 | 87.9 |
| 13 | BEA | 60.0 | 28.3 | — | — | — | MMA | 40.0 | 71.7 |
| 14 | BEA | 45.0 | 18.2 | AA | 0.4 | 0.9 | St | 54.6 | 80.9 |
| 15 | BEA | 60.0 | 29.0 | AA | 0.4 | 1.0 | St | 39.6 | 70.0 |
| 16 | BEA | 82.0 | 55.2 | AA | 0.4 | 1.4 | St | 17.6 | 43.3 |
| 17 | BEA | 100.0 | 100.0 | — | — | — | — | — | — |
| 18 | STA | 60.0 | 32.4 | AA | 0.4 | 1.0 | St | 39.6 | 66.6 |
| 19 | MYA | 60.0 | 24.0 | AA | 0.4 | 1.1 | St | 39.6 | 74.9 |
| 20 | BEA | 60.0 | 29.1 | — | — | — | St | 40.0 | 70.9 |
| 21 | HA | 60.0 | 34.4 | AA | 0.4 | 0.9 | St | 39.6 | 64.6 |
| 22 | BEA | 25.0 | 8.3 | AA | 0.4 | 0.7 | St | 74.6 | 91.0 |
| 23 | BEA | 75.7 | 46.0 | HPMA | 1.7 | 2.8 | St | 21.6 | 48.0 |
| | | | | AA | 1.0 | 3.2 | | | |

TABLE 2

| | Monomer unit derived from first polymerizable monomer | | Monomer unit derived from second polymerizable monomer | | Monomer unit derived from third polymerizable monomer | |
|---|---|---|---|---|---|---|
| First resin | Unit | $SP_{11}$ | Unit | $SP_{21}$ | Unit | $SP_{31}$ |
| 1 | BEA | 18.25 | AN | 25.96 | St | 20.11 |
| | | | AA | 28.72 | | |
| 2 | BEA | 18.25 | VA | 21.60 | St | 20.11 |
| | | | AA | 28.72 | | |
| 3 | BEA | 18.25 | AA | 28.72 | St | 20.11 |
| 4 | BEA | 18.25 | HPMA | 24.12 | St | 20.11 |
| 5 | BEA | 18.25 | HPMA | 24.12 | St | 20.11 |
| 6 | BEA | 18.25 | HPMA | 24.12 | St | 20.11 |
| 7 | BEA | 18.25 | HPMA | 24.12 | St | 20.11 |
| 8 | BEA | 18.25 | HPMA | 24.12 | St | 20.11 |
| 9 | BEA | 18.25 | AA | 28.72 | St | 20.11 |
| 10 | BEA | 18.25 | AA | 28.72 | St | 20.11 |
| 11 | BEA | 18.25 | AA | 28.72 | St | 20.11 |
| 12 | BEA | 18.25 | AA | 28.72 | St | 20.11 |
| 13 | BEA | 18.25 | — | — | MMA | 20.31 |
| 14 | BEA | 18.25 | AA | 28.72 | St | 20.11 |
| 15 | BEA | 18.25 | AA | 28.72 | St | 20.11 |
| 16 | BEA | 18.25 | AA | 28.72 | St | 20.11 |
| 17 | BEA | 18.25 | — | — | — | — |
| 18 | STA | 18.39 | AA | 28.72 | St | 20.11 |
| 19 | MYA | 18.08 | AA | 28.72 | St | 20.11 |
| 20 | BEA | 18.25 | — | — | St | 20.11 |
| 21 | HA | 18.47 | AA | 28.72 | St | 20.11 |
| 22 | BEA | 18.25 | AA | 28.72 | St | 20.11 |
| 23 | BEA | 18.25 | HPMA | 24.12 | St | 20.11 |
| | | | AA | 28.72 | | |

Units for $SP_{11}$, $SP_{21}$ and $SP_{31}$ in the tables are $(J/cm^3)^{0.5}$
Abbreviations used in Table 1 and Table 2 are as follows.
BEA: behenyl acrylate
SA: stearyl acrylate
MYA: myricyl acrylate
HA: hexadecyl acrylate
AN: acrylonitrile
HPMA: 2-hydroxypropyl methacrylate
AA: acrylic acid
VA: vinyl acetate
St: styrene
MMA: Methyl methacrylate

TABLE 3

| First resin | Weight average molecular weight (Mw) | Melting point $T_p$ [° C.] | Acid value AVa [mgKOH/g] | Hydroxyl value OHVa [mgKOH/g] | $SP_1$ $(J/cm^3)^{0.5}$ |
|---|---|---|---|---|---|
| 1 | 34000 | 61 | 20.0 | 0.0 | 19.9 |
| 2 | 50000 | 60 | 18.0 | 0.0 | 19.1 |
| 3 | 38000 | 61 | 18.0 | 0.0 | 19.0 |
| 4 | 28000 | 62 | 0.0 | 0.5 | 19.0 |
| 5 | 29000 | 62 | 0.0 | 1.0 | 19.0 |
| 6 | 40000 | 63 | 0.0 | 18.0 | 19.1 |
| 7 | 41000 | 63 | 0.0 | 21.0 | 19.1 |
| 8 | 40000 | 64 | 0.0 | 28.0 | 19.1 |
| 9 | 38000 | 59 | 0.5 | 0.0 | 19.0 |
| 10 | 38000 | 59 | 1.0 | 0.0 | 19.0 |
| 11 | 41000 | 62 | 7.0 | 0.0 | 19.0 |
| 12 | 36000 | 59 | 29.0 | 0.0 | 19.5 |
| 13 | 38000 | 60 | 0.0 | 0.0 | 19.0 |
| 14 | 46000 | 56 | 8.0 | 0.0 | 19.3 |
| 15 | 48000 | 58 | 8.0 | 0.0 | 19.0 |
| 16 | 48000 | 62 | 8.0 | 0.0 | 18.6 |
| 17 | 50000 | 64 | 0.0 | 0.0 | 18.3 |
| 18 | 56000 | 56 | 8.0 | 0.0 | 19.1 |
| 19 | 25000 | 67 | 8.0 | 0.0 | 18.9 |
| 20 | 40000 | 62 | 0.0 | 0.0 | 19.0 |
| 21 | 60000 | 49 | 8.0 | 0.0 | 18.7 |
| 22 | 40000 | 58 | 8.0 | 0.0 | 19.7 |
| 23 | 40000 | 62 | 18.0 | 16.0 | 18.8 |

Production Example of Second Resin 1 (Amorphous Resin 1)

50.0 parts of xylene was placed in an autoclave, which was then purged with nitrogen, after which the temperature of the autoclave was increased to 185° C. in a tightly sealed state under stirring.

A mixed solution of 79.0 parts of styrene, 17.0 parts of n-butyl acrylate, 3.1 parts of divinylbenzene, 0.9 parts of acrylic acid, 1.0 part of di-tert-butyl peroxide and 20.0 parts of xylene was continuously added dropwise over a period of three hours and polymerized while controlling the temperature inside the autoclave to 185° C.

The second resin 1 (amorphous resin 1) was obtained by maintaining this temperature for a further one hour to complete polymerization and remove the solvent. The second resin 1 (amorphous resin 1) had a weight average molecular weight (Mw) of 60,000, a softening point (Tm) of 140° C., an acid value of 15.0 mg KOH/g and a hydroxyl value of 0.0 mg KOH/g.

Production Examples of Second Resins 2 to 16 and 20 to 22 (Amorphous Resins 2 to 16 and 20 to 22)

Second resins 2 to 16 and 20 to 22 (amorphous resins 2 to 16 and 20 to 22) were obtained by carrying out a similar reaction to that used in the production example of the second resin 1 (amorphous resin 1), except that the monomers and numbers of parts by mass were altered in the manner shown in Table 4. Physical properties are shown in Table 5.

Production Example of Second Resin 17 (Amorphous Resin 17)

Formulation of Polyester Resin 1

| | |
|---|---|
| Adduct of (2.2 moles of) ethylene oxide to bisphenol A | 50.0 parts by mole |
| Adduct of (2.2 moles of) propylene oxide to bisphenol A | 50.0 parts by mole |
| Terephthalic acid | 65.0 parts by mole |
| Trimellitic anhydride | 25.0 parts by mole |
| Acrylic acid | 10.0 parts by mole |

90 parts of a mixture of monomers for producing polyester resin 1 was placed in a four-mouthed flask, a depressurization device, a water separation device, a nitrogen gas introduction device, a temperature measurement device and a stirring device were attached to the flask, and stirring was carried out at 160° C. in a nitrogen atmosphere.

Next, 10 parts of vinyl-based polymerizable monomers for producing a vinyl-based resin (81.0 parts of styrene, 17.0 parts of n-butyl acrylate, 0.9 parts of acrylic acid and 1.1 parts of divinylbenzene) and 1 part of benzoyl peroxide as a polymerization initiator were added dropwise over a period of four hours from a dropping funnel, and a reaction was carried out for five hours at 160° C.

The temperature was then increased to 230° C., titanium tetrabutoxide was added at an amount of 0.2 parts relative to the total amount of the monomers for producing the polyester resin, and polymerization was carried out until a softening point of 115° C. was reached. Following completion of the reaction, the second resin 17 (amorphous resin 17) was obtained by removing the polymer from the container, cooling and pulverizing. Physical properties are shown in Table 5.

Production Example of Second Resin 18 (Amorphous Resin 18)

The second resin 18 (amorphous resin 18) was obtained by carrying out a similar reaction to that used in the production example of the second resin 17 (amorphous resin 17), except that the number of parts of the monomer mixture for producing the polyester resin 1 was changed from 90 parts to 80 parts and the number of parts of the vinyl-based polymerizable monomers for producing the vinyl-based resin was changed from 10 parts to 20 parts. Physical properties are shown in Table 5.

Production Example of Second Resin 19 (Amorphous Resin 19)

The second resin 19 (amorphous resin 19) was obtained by carrying out a similar reaction to that used in the production example of the second resin 17 (amorphous resin 17), except that the number of parts of the monomer mixture for producing the polyester resin 1 was changed from 90 parts to 40 parts and the number of parts of the vinyl-based polymerizable monomers for producing the vinyl-based resin was changed from 10 parts to 60 parts. Physical properties are shown in Table 5.

TABLE 4

| Second resin | Polymerizable monomer 1 Type | Parts | Polymerizable monomer 2 Type | Parts | Polymerizable monomer 3 Type | Parts | Polymerizable monomer 4 Type | Parts | Polyester resin Type | Content in second resin (mass %) |
|---|---|---|---|---|---|---|---|---|---|---|
| 1 | St | 79.0 | BA | 17.0 | DVB | 3.1 | AA | 0.9 | — | — |
| 2 | MMA | 96.0 | — | — | DVB | 3.1 | AA | 0.9 | — | — |
| 3 | St | 80.0 | BA | 17.0 | DVB | 2.1 | AA | 0.9 | — | — |
| 4 | St | 79.0 | BA | 17.0 | DVB | 4.2 | AA | 0.9 | — | — |
| 5 | St | 79.0 | BA | 17.0 | DVB | 3.1 | AA | 0.9 | — | — |
| 6 | St | 81.0 | BA | 17.0 | DVB | 1.1 | AA | 0.9 | — | — |
| 7 | St | 80.5 | BA | 18.7 | DVB | 1.1 | HPMA | 0.2 | — | — |
| 8 | St | 80.4 | BA | 18.0 | DVB | 1.1 | HPMA | 0.5 | — | — |
| 9 | St | 80.5 | BA | 11.4 | DVB | 1.1 | HPMA | 7.0 | — | — |
| 10 | St | 80.65 | BA | 18.30 | DVB | 1.10 | AA | 0.05 | — | — |
| 11 | St | 80.8 | BA | 18.3 | DVB | 1.1 | AA | 0.1 | — | — |
| 12 | St | 80.7 | BA | 17.8 | DVB | 1.1 | AA | 0.5 | — | — |
| 13 | St | 80.0 | BA | 17.9 | DVB | 1.1 | AA | 1.0 | — | — |
| 14 | St | 79.7 | BA | 17.7 | DVB | 1.1 | AA | 1.5 | — | — |
| 15 | St | 81.2 | BA | 11.8 | DVB | 1.1 | AA | 0.9 | — | — |
|   |    |      | OA | 5.0  |     |     |    |     | — | — |
| 16 | St | 98.9 | — | — | DVB | 1.1 | — | — | — | — |
| 17 | St | 81.0 | BA | 17.0 | DVB | 1.1 | AA | 0.9 | Resin 1 | 90 |
| 18 | St | 81.0 | BA | 17.0 | DVB | 1.1 | AA | 0.9 | Resin 1 | 80 |
| 19 | St | 81.0 | BA | 17.0 | DVB | 1.1 | AA | 0.9 | Resin 1 | 40 |
| 20 | St | 81.9 | BA | 7.0 | DVB | 1.1 | — | — | — | — |
|   |    |      | DDA | 10.0 |    |     |    |     |   |   |
| 21 | St | 81.0 | BA | 7.0 | DVB | 1.1 | AA | 0.9 | — | — |
|   |    |      | OA | 10.0 |    |     |    |     |   |   |
| 22 | St | 76.0 | BA | 19.7 | DVB | 1.1 | AA | 0.3 | — | — |
|   |    |      |    |      |     |     | HPMA | 2.9 |   |   |

Abbreviations used in Table 4 are as follows.
St: styrene
MMA: Methyl methacrylate
BA: n-butyl acrylate
OA: n-octyl acrylate
DVB: divinylbenzene
DDA: dodecyl acrylate
HPMA: 2-hydroxypropyl methacrylate
AA: acrylic acid

TABLE 5

| Second resin | Weight average molecular weight (Mw) | Softening point $T_m$ [° C.] | Acid value AVi [mgKOH/g] | Hydroxyl value OHVi [mgKOH/g] | $SP_2$ [(J/cm3)0.5] |
|---|---|---|---|---|---|
| 1 | 60000 | 140 | 15.0 | 0.0 | 20.2 |
| 2 | 74000 | 135 | 17.0 | 0.0 | 20.5 |
| 3 | 47000 | 125 | 16.0 | 0.0 | 20.2 |
| 4 | 51000 | 152 | 15.0 | 0.0 | 20.3 |
| 5 | 80000 | 158 | 17.0 | 0.0 | 20.2 |
| 6 | 40000 | 115 | 16.0 | 0.0 | 20.2 |
| 7 | 50000 | 115 | 0.0 | 0.8 | 20.1 |
| 8 | 53000 | 115 | 0.0 | 2.0 | 20.1 |
| 9 | 47000 | 115 | 0.0 | 15.0 | 20.3 |
| 10 | 58000 | 115 | 0.5 | 0.0 | 20.1 |
| 11 | 58000 | 115 | 1.0 | 0.0 | 20.1 |
| 12 | 60000 | 115 | 6.0 | 0.0 | 20.1 |
| 13 | 62000 | 115 | 21.0 | 0.0 | 20.2 |
| 14 | 63000 | 115 | 28.0 | 0.0 | 20.2 |
| 15 | 45000 | 115 | 15.0 | 0.0 | 20.1 |
| 16 | 60000 | 115 | 0.0 | 0.0 | 20.1 |
| 17 | 30000 | 115 | 21.0 | 14.0 | 22.7 |
| 18 | 32000 | 115 | 18.0 | 11.0 | 22.4 |
| 19 | 36000 | 115 | 10.0 | 8.0 | 21.3 |
| 20 | 42000 | 115 | 0.0 | 0.0 | 20.0 |
| 21 | 45000 | 115 | 12.0 | 0.0 | 19.9 |
| 22 | 42000 | 121 | 6.0 | 27.0 | 20.2 |

Production Example of Binder Resin 1

| First resin 1 | 60 parts |
| Second resin 1 | 40 parts |

The components listed above were mixed and supplied at a rate of 1 kg/h to a twin screw kneader (a SSKRC kneader produced by Kurimoto, Ltd.), and 4.0 parts of t-butylperoxy isopropyl monocarbonate as a radical reaction initiator was supplied at a rate of 0.1 kg/h at the same time. A reaction was carried out while kneading and extruding for five minutes at 160° C. and 100 rpm.

Next, nitrogen was supplied from a vent and mixed while removing organic solvent. The binder resin 1 was obtained by cooling the obtained kneaded product. Through measurements using gel permeation chromatography (GPC), it was confirmed that the first resin 1 and the second resin 1 had partially reacted and the weight average molecular weight had increased. The content of the third resin in the binder resin 1 was 5 mass %.

Production Examples of Binder Resins 2 and 3

The binder resin 2 was obtained by carrying out production in the same way as in the production example of the binder resin 1, except that the first resin 2 was used instead of the first resin 1.

The binder resin 3 was obtained in the same way, except that the first resin 3 was used instead of the first resin 1.

Through measurements using GPC, it was confirmed that in the binder resin 2, the first resin 2 and the second resin 1 had partially reacted and that the molecular weight had increased. The content of the third resin in the binder resin 2 was 5 mass %. It was confirmed that in the binder resin 3, the first resin 3 and the second resin 1 had partially reacted and that the molecular weight had increased. The content of the third resin in the binder resin 3 was 5 mass %.

Production Example of Binder Resin 4

The binder resin 4 was obtained through production in the same way as in the production example of the binder resin 3, except that the number of parts by mass of the radical reaction initiator was changed from 4.0 parts to 3.0 parts.

Through measurements using GPC, it was confirmed that the first resin 3 and the second resin 1 had partially reacted and that the molecular weight had increased. The content of the third resin in the binder resin 4 was 3 mass %.

Production Example of Binder Resin 5

The binder resin 5 was obtained by carrying out production in the same way as in the production example of the binder resin 3, except that the number of parts by mass of the radical reaction initiator was changed from 4.0 parts to 1.0 parts.

Through measurements using GPC, it was confirmed that the first resin 3 and the second resin 1 had partially reacted and that the molecular weight had increased. The content of the third resin in the binder resin 5 was 1 mass %.

Production Example of Binder Resin 6

The binder resin 6 was obtained by carrying out production in the same way as in the production example of the binder resin 3, except that the resin supply rate was changed from 1.0 kg/h to 0.5 kg/h.

Through measurements using GPC, it was confirmed that the first resin 3 and the second resin 1 had partially reacted and that the molecular weight had increased. The content of the third resin in the binder resin 6 was 2 mass %.

Production Example of Binder Resin 7

The binder resin 7 was obtained by carrying out production in the same way as in the production example of the binder resin 6, except that the number of parts by mass of the radical reaction initiator was changed from 4.0 parts to 8.0 parts.

Through measurements using GPC, it was confirmed that the first resin 3 and the second resin 1 had partially reacted and that the molecular weight had increased. The content of the third resin in the binder resin 7 was 4 mass %.

Production Example of Binder Resin 8

The binder resin 8 was obtained by carrying out production in the same way as in the production example of the binder resin 6, except that the number of parts by mass of the radical reaction initiator was changed from 4.0 parts to 12.0 parts. Through measurements using GPC, it was confirmed that the first resin 3 and the second resin 1 had partially reacted and that the molecular weight had increased. The content of the third resin in the binder resin 8 was 8 mass %.

Production Example of Toner Particle 1

| | |
|---|---|
| Binder resin 1 | 100 parts |
| Hydrocarbon wax | 5.0 parts |

(Fischer Tropsch wax; peak temperature of maximum endothermic peak in DSC: 90° C.)

| | |
|---|---|
| C.I. Pigment Blue 15:3 | 6.5 parts |

Using a Henschel mixer (an FM-75 model, produced by Nippon Coke and Engineering Co., Ltd.), the materials listed above were mixed at a rotational speed of 20 $s^{-1}$ for a period of five minutes, and then kneaded using a twin screw kneader set to a temperature of 130° C. (a PCM-30 model, produced by Ikegai Corp) at a screw rotation speed of 250 rpm and a discharge temperature of 130° C. The obtained kneaded product was cooled and then coarsely pulverized to a size of not more than 1 mm using a hammer mill so as to obtain a coarsely pulverized product. The obtained coarsely pulverized product was then finely pulverized using a mechanical pulverizer (a T-250, produced by Freund Turbo Corporation).

Toner particle 1 having a weight average particle diameter of 6.0 μm was then obtained by classifying the finely pulverized product using a Faculty F-300 (produced by Hosokawa Micron Corporation.). Operating conditions were such that the rotational speed of a classifying rotor was 130 $s^{-1}$ and the rotational speed of a dispersing rotor was 120 $s^{-1}$.

Production Examples of Toner Particles 2 to 41 and 43 to 66

Toner particles 2 to 41 and 43 to 66 were obtained by carrying out production in the same way as in the production example of toner particle 1, except that the resins used, the added amounts thereof, the kneading temperature, and the screw rotation speed (shown in the tables as rotation speed $min^{-1}$) were changed as shown in Tables 6 to 1 to 6 to 3 (for example, for toner particle 9, 60 parts of crystalline resin 1 and 40 parts of amorphous resin 1 were used instead of binder resin 1). Moreover, production method "1" in the production conditions in the tables means a "melt kneading method", and production method "2" means an "emulsion aggregation method".

TABLE 6-1

| Toner particle No. | Formulation | | | | Production conditions | | |
|---|---|---|---|---|---|---|---|
| | Binder resin No. | Parts | Other resin | Parts | Production method | kneading temperature ° C. | Speed of rotation $min^{-1}$ |
| 1 | 1 | 100 | — | — | 1 | 130 | 250 |
| 2 | 2 | 100 | — | — | 1 | 130 | 250 |
| 3 | 3 | 100 | — | — | 1 | 130 | 250 |

TABLE 6-1-continued

| Toner particle No. | Formulation | | | | Production conditions | | |
|---|---|---|---|---|---|---|---|
| | Binder resin No. | Parts | Other resin | Parts | Production method | kneading temperature °C. | Speed of rotation min$^{-1}$ |
| 4 | 4 | 100 | — | — | 1 | 130 | 250 |
| 5 | 5 | 100 | — | — | 1 | 130 | 250 |
| 6 | 6 | 100 | — | — | 1 | 130 | 250 |
| 7 | 7 | 100 | — | — | 1 | 130 | 250 |
| 8 | 8 | 100 | — | — | 1 | 130 | 250 |

TABLE 6-2

| Toner particle No. | Formulation | | | | | | Production conditions | | |
|---|---|---|---|---|---|---|---|---|---|
| | First resin No. | Parts | Second resin No. | Parts | Wax No. | Parts | Production method | Kneading temperature °C. | Speed of rotation min$^{-1}$ |
| 9 | Crystalline resin 1 | 60 | Amorphous resin 1 | 40 | Wax 1 | 5.0 | 1 | 130 | 250 |
| 10 | Crystalline resin 2 | 60 | Amorphous resin 1 | 40 | Wax 1 | 5.0 | 1 | 130 | 250 |
| 11 | Crystalline resin 3 | 60 | Amorphous resin 1 | 40 | Wax 1 | 5.0 | 1 | 130 | 250 |
| 12 | Crystalline resin 3 | 60 | Amorphous resin 2 | 40 | Wax 1 | 5.0 | 1 | 130 | 250 |
| 13 | Crystalline resin 3 | 60 | Amorphous resin 3 | 40 | Wax 1 | 5.0 | 1 | 130 | 250 |
| 14 | Crystalline resin 3 | 60 | Amorphous resin 4 | 40 | Wax 1 | 5.0 | 1 | 130 | 250 |
| 15 | Crystalline resin 3 | 60 | Amorphous resin 5 | 40 | Wax 1 | 5.0 | 1 | 130 | 250 |
| 16 | Crystalline resin 3 | 60 | Amorphous resin 6 | 40 | Wax 1 | 5.0 | 1 | 130 | 250 |
| 17 | Crystalline resin 4 | 60 | Amorphous resin 7 | 40 | Wax 1 | 5.0 | 1 | 130 | 250 |
| 18 | Crystalline resin 5 | 60 | Amorphous resin 8 | 40 | Wax 1 | 5.0 | 1 | 130 | 250 |
| 19 | Crystalline resin 6 | 60 | Amorphous resin 9 | 40 | Wax 1 | 5.0 | 1 | 130 | 250 |
| 20 | Crystalline resin 7 | 60 | Amorphous resin 8 | 40 | Wax 1 | 5.0 | 1 | 130 | 250 |
| 21 | Crystalline resin 6 | 60 | Amorphous resin 9 | 40 | Wax 1 | 5.0 | 1 | 130 | 250 |
| 22 | Crystalline resin 8 | 60 | Amorphous resin 9 | 40 | Wax 1 | 5.0 | 1 | 130 | 250 |
| 23 | Crystalline resin 8 | 60 | Amorphous resin 8 | 40 | Wax 1 | 5.0 | 1 | 130 | 250 |
| 24 | Crystalline resin 9 | 60 | Amorphous resin 10 | 40 | Wax 1 | 5.0 | 1 | 130 | 250 |
| 25 | Crystalline resin 10 | 60 | Amorphous resin 11 | 40 | Wax 1 | 5.0 | 1 | 130 | 250 |
| 26 | Crystalline resin 3 | 60 | Amorphous resin 11 | 40 | Wax 1 | 5.0 | 1 | 130 | 250 |
| 27 | Crystalline resin 3 | 60 | Amorphous resin 12 | 40 | Wax 1 | 5.0 | 1 | 130 | 250 |
| 28 | Crystalline resin 11 | 60 | Amorphous resin 13 | 40 | Wax 1 | 5.0 | 1 | 130 | 250 |
| 29 | Crystalline resin 12 | 60 | Amorphous resin 14 | 40 | Wax 1 | 5.0 | 1 | 130 | 250 |
| 30 | Crystalline resin 12 | 60 | Amorphous resin 11 | 40 | Wax 1 | 5.0 | 1 | 130 | 250 |
| 31 | Crystalline resin 23 | 60 | Amorphous resin 22 | 40 | Wax 1 | 5.0 | 1 | 130 | 250 |
| 32 | Crystalline resin 3 | 85 | Amorphous resin 6 | 15 | Wax 1 | 5.0 | 1 | 130 | 250 |
| 33 | Crystalline resin 3 | 70 | Amorphous resin 6 | 30 | Wax 1 | 5.0 | 1 | 130 | 250 |
| 34 | Crystalline resin 3 | 52 | Amorphous resin 6 | 48 | Wax 1 | 5.0 | 1 | 130 | 250 |
| 35 | Crystalline resin 3 | 38 | Amorphous resin 6 | 62 | Wax 1 | 5.0 | 1 | 130 | 250 |

TABLE 6-3

| Toner particle No. | Formulation | | | | | | Production conditions | | |
|---|---|---|---|---|---|---|---|---|---|
| | First resin No. | Parts | Second resin No. | Parts | Wax No. | Parts | Production method | Kneading temperature °C. | Speed of rotation min$^{-1}$ |
| 36 | Crystalline resin 3 | 90 | Amorphous resin 6 | 10 | Wax 1 | 5.0 | 1 | 130 | 250 |
| 37 | Crystalline resin 3 | 60 | Amorphous resin 15 | 40 | Wax 1 | 5.0 | 1 | 130 | 250 |
| 38 | Crystalline resin 3 | 60 | Amorphous resin 6 | 40 | Wax 1 | 5.0 | 1 | 110 | 350 |
| 39 | Crystalline resin 3 | 60 | Amorphous resin 6 | 40 | Wax 1 | 5.0 | 1 | 140 | 200 |
| 40 | Crystalline resin 3 | 60 | Amorphous resin 6 | 40 | Wax 1 | 5.0 | 1 | 150 | 150 |
| 41 | Crystalline resin 13 | 60 | Amorphous resin 16 | 40 | Wax 1 | 5.0 | 1 | 130 | 250 |
| 42 | Crystalline resin 3 | 60 | Amorphous resin 6 | 40 | Wax 1 | 5.0 | 2 | — | — |
| 43 | Crystalline resin 11 | 60 | Amorphous resin 17 | 40 | Wax 1 | 5.0 | 1 | 130 | 250 |
| 44 | Crystalline resin 11 | 60 | Amorphous resin 18 | 40 | Wax 1 | 5.0 | 1 | 130 | 250 |
| 45 | Crystalline resin 11 | 60 | Amorphous resin 19 | 40 | Wax 1 | 5.0 | 1 | 130 | 250 |
| 46 | Crystalline resin 12 | 60 | Amorphous resin 6 | 40 | Wax 1 | 5.0 | 1 | 130 | 250 |
| 47 | Crystalline resin 14 | 60 | Amorphous resin 6 | 40 | Wax 1 | 5.0 | 1 | 130 | 250 |

TABLE 6-3-continued

| Toner particle No. | First resin No. | Parts | Second resin No. | Parts | Wax No. | Parts | Production method | Kneading temperature °C | Speed of rotation min⁻¹ |
|---|---|---|---|---|---|---|---|---|---|
| 48 | Crystalline resin 15 | 60 | Amorphous resin 6 | 40 | Wax 1 | 5.0 | 1 | 130 | 250 |
| 49 | Crystalline resin 16 | 60 | Amorphous resin 6 | 40 | Wax 1 | 5.0 | 1 | 130 | 250 |
| 50 | Crystalline resin 17 | 60 | Amorphous resin 6 | 40 | Wax 1 | 5.0 | 1 | 130 | 250 |
| 51 | Crystalline resin 18 | 60 | Amorphous resin 6 | 40 | Wax 1 | 5.0 | 1 | 130 | 250 |
| 52 | Crystalline resin 19 | 60 | Amorphous resin 6 | 40 | Wax 1 | 5.0 | 1 | 130 | 250 |
| 53 | Crystalline resin 20 | 60 | Amorphous resin 6 | 40 | Wax 1 | 5.0 | 1 | 130 | 250 |
| 54 | Crystalline resin 3 | 100 | — | 0 | Wax 1 | 5.0 | 1 | 130 | 250 |
| 55 | Crystalline resin 21 | 60 | Amorphous resin 6 | 40 | Wax 1 | 5.0 | 1 | 130 | 250 |
| 56 | Crystalline resin 22 | 60 | Amorphous resin 6 | 40 | Wax 1 | 5.0 | 1 | 130 | 250 |
| 57 | Crystalline resin 20 | 60 | Amorphous resin 20 | 40 | Wax 1 | 5.0 | 1 | 130 | 250 |
| 58 | Crystalline resin 11 | 24 | Amorphous resin 6 | 76 | Wax 1 | 5.0 | 1 | 130 | 250 |
| 59 | Crystalline resin 11 | 60 | Amorphous resin 21 | 40 | Wax 1 | 5.0 | 1 | 130 | 250 |
| 60 | Crystalline resin 14 | 60 | Amorphous resin 6 | 40 | Wax 1 | 5.0 | 1 | 130 | 100 |
| 61 | Crystalline resin 3 | 60 | Amorphous resin 6 | 40 | Wax 1<br>Wax 2 | 5.0<br>0.5 | 1 | 130 | 250 |
| 62 | Crystalline resin 3 | 60 | Amorphous resin 6 | 40 | Wax 1<br>Wax 2 | 5.0<br>1.0 | 1 | 130 | 250 |
| 63 | Crystalline resin 3 | 60 | Amorphous resin 6 | 40 | Wax 1<br>Wax 2 | 5.0<br>2.0 | 1 | 130 | 250 |
| 64 | Crystalline resin 3 | 60 | Amorphous resin 6 | 40 | Wax 1<br>Wax 2 | 5.0<br>5.0 | 1 | 130 | 250 |
| 65 | Crystalline resin 3 | 60 | Amorphous resin 6 | 40 | Wax 1<br>Wax 2 | 5.0<br>10.0 | 1 | 130 | 250 |
| 66 | Crystalline resin 3 | 60 | Amorphous resin 6 | 40 | Wax 2<br>Wax 3 | 5.0<br>5.0 | 1 | 130 | 250 |

Wax 1: Fischer Tropsch wax; peak temperature of maximum endothermic peak in DSC: 90° C.
Wax 2: Fischer Tropsch wax; peak temperature of maximum endothermic peak in DSC: 105° C.
Wax 3: Petroleum wax; peak temperature of maximum endothermic peak in DSC: 78° C.

Production Example of Crystalline Resin 3 Fine Particle-Dispersed Solution

| | |
|---|---|
| Toluene (produced by Wako Pure Chemical Industries, Ltd.) | 300 parts |
| Crystalline resin 3 | 100 parts |

The materials listed above were weighed out, mixed and dissolved at 90° C.

Separately, 5.0 parts of sodium dodecylbenzene sulfonate and 10.0 parts of sodium laurate were added to 700 parts of ion exchanged water, and dissolved by heating at 90° C. Next, the toluene solution and aqueous solution mentioned above were mixed together and stirred at 7000 rpm using a T.K. Robomix ultrahigh speed stirrer (produced by Primix Corporation). The obtained mixture was then emulsified at a pressure of 200 MPa using a Nanomizer high pressure impact disperser (produced by Yoshida Kikai Co., Ltd.). An aqueous dispersed solution containing fine particles of crystalline resin 3 at a concentration of 20 mass % (crystalline resin 3 fine particle-dispersed solution) was then obtained by removing the toluene using an evaporator and adjusting the concentration using ion exchanged water.

The 50% particle diameter on a volume basis (D50) of the crystalline resin fine particles 3 was measured using a dynamic light scattering particle size distribution analyzer (Nanotrac UPA-EX150 produced by Nikkiso Co., Ltd.), and found to be 0.40 μm.

Production Example of Amorphous Resin 6 Fine Particle-Dispersed Solution

| | |
|---|---|
| Tetrahydrofuran (produced by Wako Pure Chemical Industries, Ltd.) | 300 parts |
| Amorphous resin 6 | 100 parts |
| Anionic surfactant (Neogen RK produced by DKS Co., Ltd.) | 0.5 parts |

The materials listed above were weighed out, mixed and dissolved.

Next, 20.0 parts of 1 mol/L aqueous ammonia was added and stirred at 4000 rpm using a T.K. Robomix ultrahigh speed stirrer (produced by Primix Corporation). 700 parts of ion exchanged water was then added at a rate of 8 g/min so as to precipitate amorphous resin 6 fine particles. An aqueous dispersed solution containing amorphous resin 6 fine particles at a concentration of 20 mass % (a dispersed solution of amorphous resin 6 fine particles) was then obtained by removing the tetrahydrofuran using an evaporator and adjusting the concentration by means of ion exchanged water. The 50% particle diameter on a volume basis (D50) of amorphous resin 6 fine particles was 0.14 μm.

Production Example of Wax Fine Particle-Dispersed Solution

| | |
|---|---|
| Hydrocarbon wax | 100 parts |

(Fischer Tropsch wax; peak temperature of maximum endothermic peak in DSC: 90° C.)

| | |
|---|---|
| Anionic surfactant (Neogen RK produced by DKS Co., Ltd.) | 5 parts |
| Ion exchanged water | 395 parts |

The materials listed above were weighed out and placed in a mixing vessel equipped with a stirring device, heated to 90° C. and subjected to dispersion treatment for 60 minutes by being circulated in a Clearmix W-Motion (produced by M Technique Co., Ltd.). The dispersion treatment conditions were as follows.

| | |
|---|---|
| Rotor outer diameter | 3 cm |
| Clearance | 0.3 mm |
| Rotational speed of rotor | 19,000 rpm |
| Rotational speed of screen | 19,000 rpm |

Following the dispersion treatment, an aqueous dispersed solution (a wax fine particle-dispersed solution) in which the concentration of wax (hydrocarbon compound) fine particles was 20 mass % was obtained by cooling to 40° C. at a rotor rotational speed of 1000 rpm, a screen rotational speed of 0 rpm and a cooling rate of 10° C./min.

The 50% particle diameter on a volume basis (D50) of the wax (hydrocarbon compound) fine particles was measured using a dynamic light scattering particle size distribution analyzer (Nanotrac UPA-EX150 produced by Nikkiso Co., Ltd.), and found to be 0.15 μm.

Production Example of Colorant Fine Particle-Dispersed Solution

| | |
|---|---|
| Colorant | 50.0 parts |

(Cyan pigment, Pigment Blue 15:3 produced by Dainichiseika Color and Chemicals Mfg. Co., Ltd.)

| | |
|---|---|
| Anionic surfactant (Neogen RK produced by DKS Co., Ltd.) | 7.5 parts |
| Ion exchanged water | 442.5 parts |

An aqueous dispersed solution containing colorant fine particles at a concentration of 10 mass % (a colorant fine particle-dispersed solution) was obtained by weighing out, mixing and dissolving the materials listed above and dispersing for approximately one hour using a Nanomizer high pressure impact disperser (produced by Yoshida Kikai Co., Ltd.) so as to disperse the colorant.

The 50% particle diameter on a volume basis (D50) of the colorant fine particle 1 was measured using a dynamic light scattering particle size distribution analyzer (a Nanotrac UPA-EX150 produced by Nikkiso Co., Ltd.), and found to be 0.20 μm.

Production Example of Toner Particle 42

| | |
|---|---|
| Crystalline resin 3 fine particle-dispersed solution | 300 parts |
| Amorphous resin 6 fine particle-dispersed solution | 200 parts |
| Colorant fine particle-dispersed solution | 65 parts |
| Wax fine particle-dispersed solution | 25 parts |
| Ion exchanged water | 160 parts |

The materials listed above were placed in a round stainless steel flask and mixed. Next, the obtained mixed solution was dispersed for 10 minutes at 5000 r/min using a homogenizer (an Ultratarax T50 produced by IKA). A 1.0% aqueous solution of nitric acid was added to adjust the pH to 3.0, and the mixed solution was then heated to 58° C. in a heating water bath while appropriately adjusting the speed of rotation of a stirring blade so that the mixed solution was stirred. The formed aggregated particles were appropriately confirmed using a Coulter Multisizer III, and when aggregated particles having a weight average particle diameter (D4) of approximately 6.00 μm were formed, the pH was adjusted to 9.0 using a 5% aqueous solution of sodium hydroxide.

The solution was then heated to 75° C. while continuing the stirring. The aggregate particles were fused together by maintaining a temperature of 75° C. for one hour.

Crystallization of the resin was then facilitated by cooling to 50° C. and maintaining this temperature for three hours.

The mixture was then cooled to 25° C., filtered, subjected to solid-liquid separation, and then washed with ion exchanged water. Following completion of the washing, toner particle 42 having a weight-average particle diameter (D4) of approximately 6.0 μm was obtained by drying with a vacuum dryer.

Production Example of Toner 1

| | |
|---|---|
| Toner particle 1 | 100 parts |
| Silica fine particles 1 | 0.5 parts |

(hydrophobically treated silica fine particles having a number average primary particle diameter of 15 nm)

| | |
|---|---|
| Silica fine particles 2: | 1.0 parts |

(hydrophobically treated silica fine particles having a number average primary particle diameter of 80 nm)

Toner 1 was obtained by mixing the materials listed above in an FM-10C Henschel mixer (produced by Mitsui Miike Kakoki Corporation) at a rotation speed of 30 $s^{-1}$ and a rotation time of 10 minutes. Physical properties are shown in Table 7-1.

Production Examples of Toners 2 to 60

Toners 2 to 60 were obtained by carrying out production in the same way as in the production example of toner 1, except that the toner particle was changed to that shown in Table 7. Physical properties of obtained toners 2 to 60 are shown in Table 7-2 and Table 7-3.

In addition, in Table 7-1 to Table 7-3, "A" denotes the peak temperature (units: ° C.) of an endothermic peak of tetrahydrofuran-insoluble matter in toner resin components, as measured using a differential scanning calorimeter, and "B" denotes the endothermic amount ΔHt (units: J/g) of the endothermic peak.

TABLE 7-1

| Toner No. | Toner particle No. | Physical properties | | | Domain-matrix structure | | | |
|---|---|---|---|---|---|---|---|---|
| | | Weight average particle diameter (μm) | A (° C.) | B ΔHt (J/g) | Matrix | Domain | Number average diameter of domains (μm) | Areal ratio of domains (%) |
| 1 | 1 | 6.1 | 61 | 10 | Crystalline resin | Amorphous resin | 0.40 | 55 |
| 2 | 2 | 6.1 | 60 | 10 | Crystalline resin | Amorphous resin | 0.60 | 53 |
| 3 | 3 | 6.1 | 61 | 1 | Crystalline resin | Amorphous resin | 0.50 | 56 |
| 4 | 4 | 6.1 | 61 | 4 | Crystalline resin | Amorphous resin | 0.50 | 57 |
| 5 | 5 | 6.1 | 61 | 10 | Crystalline resin | Amorphous resin | 0.50 | 53 |
| 6 | 6 | 6.1 | 61 | 18 | Crystalline resin | Amorphous resin | 0.50 | 53 |
| 7 | 7 | 6.1 | 61 | 28 | Crystalline resin | Amorphous resin | 0.40 | 50 |
| 8 | 8 | 6.1 | 61 | 33 | Crystalline resin | Amorphous resin | 0.40 | 50 |

TABLE 7-2

| Toner No. | Toner particle No. | Physical properties | | | Domain-matrix structure | | | |
|---|---|---|---|---|---|---|---|---|
| | | Weight average particle diameter (μm) | A (° C.) | B ΔHt (J/g) | Matrix | Domain | Number average diameter of domains (μm) | Areal ratio of domains (%) |
| 9 | 9 | 6.1 | — | — | Crystalline resin | Amorphous resin | 0.40 | 55 |
| 10 | 10 | 6.1 | — | — | Crystalline resin | Amorphous resin | 0.60 | 53 |
| 11 | 11 | 6.1 | — | — | Crystalline resin | Amorphous resin | 0.60 | 55 |
| 12 | 12 | 6.1 | — | — | Crystalline resin | Amorphous resin | 0.50 | 55 |
| 13 | 13 | 6.1 | — | — | Crystalline resin | Amorphous resin | 0.40 | 50 |
| 14 | 14 | 6.1 | — | — | Crystalline resin | Amorphous resin | 0.60 | 55 |
| 15 | 15 | 6.1 | — | — | Crystalline resin | Amorphous resin | 0.50 | 57 |
| 16 | 16 | 6.1 | — | — | Crystalline resin | Amorphous resin | 0.40 | 53 |
| 17 | 17 | 6.1 | — | — | Crystalline resin | Amorphous resin | 0.50 | 56 |
| 18 | 18 | 6.1 | — | — | Crystalline resin | Amorphous resin | 0.50 | 56 |
| 19 | 19 | 6.1 | — | — | Crystalline resin | Amorphous resin | 0.50 | 55 |
| 20 | 20 | 6.1 | — | — | Crystalline resin | Amorphous resin | 0.50 | 54 |
| 21 | 21 | 6.1 | — | — | Crystalline resin | Amorphous resin | 0.50 | 58 |
| 22 | 22 | 6.1 | — | — | Crystalline resin | Amorphous resin | 0.50 | 55 |
| 23 | 23 | 6.1 | — | — | Crystalline resin | Amorphous resin | 0.50 | 54 |
| 24 | 24 | 6.1 | — | — | Crystalline resin | Amorphous resin | 0.50 | 55 |
| 25 | 25 | 6.1 | — | — | Crystalline resin | Amorphous resin | 0.40 | 55 |
| 26 | 26 | 6.1 | — | — | Crystalline resin | Amorphous resin | 0.40 | 56 |
| 27 | 27 | 6.1 | — | — | Crystalline resin | Amorphous resin | 0.40 | 57 |
| 28 | 28 | 6.1 | — | — | Crystalline resin | Amorphous resin | 0.40 | 55 |
| 29 | 29 | 6.1 | — | — | Crystalline resin | Amorphous resin | 0.40 | 55 |
| 30 | 30 | 6.1 | — | — | Crystalline resin | Amorphous resin | 0.40 | 56 |
| 31 | 31 | 6.1 | — | — | Crystalline resin | Amorphous resin | 0.30 | 56 |
| 32 | 32 | 6.1 | — | — | Crystalline resin | Amorphous resin | 0.40 | 18 |
| 33 | 33 | 6.1 | — | — | Crystalline resin | Amorphous resin | 0.50 | 36 |
| 34 | 34 | 6.1 | — | — | Crystalline resin | Amorphous resin | 0.40 | 63 |
| 35 | 35 | 6.1 | — | — | Crystalline resin | Amorphous resin | 0.40 | 76 |
| 36 | 36 | 6.1 | — | — | Crystalline resin | Amorphous resin | 0.30 | 12 |

TABLE 7-3

| Toner No. | Toner particle No. | Physical properties | | | Domain-matrix structure | | | |
|---|---|---|---|---|---|---|---|---|
| | | Weight average particle diameter (μm) | A (° C.) | B ΔHt (J/g) | Matrix | Domain | Number average diameter of domains (μm) | Areal ratio of domains (%) |
| 37 | 37 | 6.1 | — | — | Crystalline resin | Amorphous resin | 0.10 | 55 |
| 38 | 38 | 6.1 | — | — | Crystalline resin | Amorphous resin | 0.20 | 55 |
| 39 | 39 | 6.1 | — | — | Crystalline resin | Amorphous resin | 0.80 | 55 |
| 40 | 40 | 6.1 | — | — | Crystalline resin | Amorphous resin | 1.20 | 55 |
| 41 | 41 | 6.1 | — | — | Crystalline resin | Amorphous resin | 1.80 | 55 |

TABLE 7-3-continued

| | | Physical properties | | | Domain-matrix structure | | | |
|---|---|---|---|---|---|---|---|---|
| Toner No. | Toner particle No. | Weight average particle diameter (μm) | A (° C.) | B ΔHt (J/g) | Matrix | Domain | Number average diameter of domains (μm) | Areal ratio of domains (%) |
| 42 | 42 | 6.1 | — | — | Crystalline resin | Amorphous resin | 0.50 | 55 |
| 43 | 43 | 6.1 | — | — | Crystalline resin | Amorphous resin | 1.20 | 60 |
| 44 | 44 | 6.1 | — | — | Crystalline resin | Amorphous resin | 1.00 | 55 |
| 45 | 45 | 6.1 | — | — | Crystalline resin | Amorphous resin | 0.70 | 55 |
| 46 | 46 | 6.1 | — | — | Crystalline resin | Amorphous resin | 0.30 | 60 |
| 47 | 47 | 6.1 | — | — | Crystalline resin | Amorphous resin | 0.40 | 60 |
| 48 | 48 | 6.1 | — | — | Crystalline resin | Amorphous resin | 0.60 | 60 |
| 49 | 49 | 6.1 | — | — | Crystalline resin | Amorphous resin | 1.40 | 50 |
| 50 | 50 | 6.1 | — | — | Crystalline resin | Amorphous resin | 1.70 | 55 |
| 51 | 51 | 6.1 | — | — | Crystalline resin | Amorphous resin | 0.50 | 55 |
| 52 | 52 | 6.1 | — | — | Crystalline resin | Amorphous resin | 0.80 | 53 |
| 53 | 53 | 6.1 | — | — | Crystalline resin | Amorphous resin | 1.10 | 55 |
| 54 | 54 | 6.1 | — | — | Crystalline resin | None | — | — |
| 55 | 55 | 6.1 | — | — | Crystalline resin | Amorphous resin | 0.50 | 55 |
| 56 | 56 | 6.1 | — | — | Crystalline resin | Amorphous resin | 0.30 | 60 |
| 57 | 57 | 6.1 | — | — | Compatible | | — | — |
| 58 | 58 | 6.1 | — | — | Amorphous resin | Crystalline resin | — | — |
| 59 | 59 | 6.1 | — | — | Crystalline resin | Amorphous resin | 0.03 | 45 |
| 60 | 60 | 6.1 | — | — | Crystalline resin | Amorphous resin | 2.40 | 60 |
| 61 | 61 | 6.1 | — | — | Crystalline resin | Amorphous resin | 0.42 | 53 |
| 62 | 62 | 6.1 | — | — | Crystalline resin | Amorphous resin | 0.43 | 52 |
| 63 | 63 | 6.1 | — | — | Crystalline resin | Amorphous resin | 0.41 | 51 |
| 64 | 64 | 6.1 | — | — | Crystalline resin | Amorphous resin | 0.38 | 55 |
| 65 | 65 | 6.1 | — | — | Crystalline resin | Amorphous resin | 0.35 | 56 |
| 66 | 66 | 6.1 | — | — | Crystalline resin | Amorphous resin | 0.45 | 51 |

Production Example of Magnetic Carrier 1

Magnetite 1; number average particle diameter: 0.30 μm (intensity of magnetization in a magnetic field of 1000/4π (kA/m): 65 Am$^2$/kg)

Magnetite 2; number average particle diameter: 0.50 μm (intensity of magnetization in a magnetic field of 1000/4π (kA/m): 65 Am$^2$/kg)

4.0 parts of a silane compound (3-(2-aminoethylamino-propyl)trimethoxysilane) was added to 100 parts of each of the materials listed above, and subjected to high speed mixing and agitation at a temperature of at least 100° C. in a container so as to treat the fine particles.

Phenol: 10 mass %

Formaldehyde solution: 6 mass % (40 mass % of formaldehyde, 10 mass % of methanol and 50 mass % of water)

Magnetite 1 treated with the silane compound mentioned above: 58 mass %

Magnetite 2 treated with the silane compound mentioned above: 26 mass %

100 parts of the materials listed above, 5 parts of a 28 mass % aqueous solution of ammonia and 20 parts of water were placed in a flask, the temperature was increased to 85° C. and held at this temperature for a period of 30 minutes while agitating and mixing, a polymerization reaction was carried out for three hours, and the obtained phenol resin was cured.

The cured phenol resin was then cooled to 30° C., water was added, the supernatant liquid was removed, and the obtained precipitate was washed with water and air dried.

Next, spherical magnetic carrier 1 was obtained in the form of a magnetic material dispersion by drying the precipitate at a temperature of 60° C. under reduced pressure (not more than 5 mm Hg). The 50% particle diameter on a volume basis (D50) of magnetic carrier 1 was 34.2 μm.

Production Example of Two Component Developer 1

Two Component Developer 1 was obtained by adding 8.0 parts of toner 1 to 92.0 parts of magnetic carrier 1, and mixing using a V type mixer (a V-20 produced by Seishin Enterprise Co., Ltd.).

Production Examples of Two Component Developers 2 to 66

Two component developers 2 to 66 were obtained by carrying out production in the same way as in the production example of two component developer 1, except that the toner was altered in the manner shown in Table 8.

TABLE 8

| Two component developer No. | Toner No. | Carrier No. |
|---|---|---|
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 7 | 1 |
| 8 | 8 | 1 |
| 9 | 9 | 1 |
| 10 | 10 | 1 |
| 11 | 11 | 1 |
| 12 | 12 | 1 |
| 13 | 13 | 1 |
| 14 | 14 | 1 |
| 15 | 15 | 1 |
| 16 | 16 | 1 |
| 17 | 17 | 1 |

TABLE 8-continued

| Two component developer No. | Toner No. | Carrier No. |
|---|---|---|
| 18 | 18 | 1 |
| 19 | 19 | 1 |
| 20 | 20 | 1 |
| 21 | 21 | 1 |
| 22 | 22 | 1 |
| 23 | 23 | 1 |
| 24 | 24 | 1 |
| 25 | 25 | 1 |
| 26 | 26 | 1 |
| 27 | 27 | 1 |
| 28 | 28 | 1 |
| 29 | 29 | 1 |
| 30 | 30 | 1 |
| 31 | 31 | 1 |
| 32 | 32 | 1 |
| 33 | 33 | 1 |
| 34 | 34 | 1 |
| 35 | 35 | 1 |
| 36 | 36 | 1 |
| 37 | 37 | 1 |
| 38 | 38 | 1 |
| 39 | 39 | 1 |
| 40 | 40 | 1 |
| 41 | 41 | 1 |
| 42 | 42 | 1 |
| 43 | 43 | 1 |
| 44 | 44 | 1 |
| 45 | 45 | 1 |
| 46 | 46 | 1 |
| 47 | 47 | 1 |
| 48 | 48 | 1 |
| 49 | 49 | 1 |
| 50 | 50 | 1 |
| 51 | 51 | 1 |
| 52 | 52 | 1 |
| 53 | 53 | 1 |
| 54 | 54 | 1 |
| 55 | 55 | 1 |
| 56 | 56 | 1 |
| 57 | 57 | 1 |
| 58 | 58 | 1 |
| 59 | 59 | 1 |
| 60 | 60 | 1 |
| 61 | 61 | 1 |
| 62 | 62 | 1 |
| 63 | 63 | 1 |
| 64 | 64 | 1 |
| 65 | 65 | 1 |
| 66 | 66 | 1 |

Example 1

Evaluations were carried out using the two component developer 1.

A modified printer obtained by modifying an imageRUNNER ADVANCE C5560 industrial digital printer produced by Canon Inc. was used as an image forming apparatus, and two component developer 1 was introduced into the cyan developing device of this apparatus. The apparatus was modified so that the fixation temperature, the processing speed, the direct current voltage VDC of the developer bearing member, the charging voltage VD of the electrostatic latent image bearing member and the laser power could be freely set. Image output evaluations were carried out by outputting FFh images (solid images) having a prescribed image ratio, adjusting VDC, VD and laser power so that the toner laid-on levels of FFh images on the paper were prescribed values, and carrying out the evaluations described below.

FFh is a value that indicates 256 colors as 16 binary numbers, with 00h denoting the 1st gradation of 256 colors (a white background part), and FFh denoting the 256th of 256 colors (a solid part).

Evaluations were carried out on the basis of the evaluation methods described below, and the results are shown in Table 9-1.

Low-Temperature Fixability
Paper: GFC-081 (81.0 g/m$^2$)
(sold by Canon Marketing Japan K.K.)
Toner laid-on level on paper: 0.70 mg/cm$^2$
(Adjusted by altering the direct current voltage VDC of the developer bearing member, the charging voltage VD of the electrostatic latent image bearing member and the laser power)
Evaluation image: An image measuring 2 cm×5 cm was disposed in the center of an A4 sheet of the paper mentioned above
Test environment: Low temperature low humidity environment (temperature: 15° C., humidity: 10% RH) (hereinafter abbreviated to "L/L")
Fixation temperature: 140° C.
Processing speed: 400 mm/sec The evaluation image mentioned above was outputted and low-temperature fixability was evaluated. The image density decrease rate was used as an indicator for evaluating low-temperature fixability.

The image density decrease rate is first measured for image density in a central part of an image using an X-Rite color reflection densitometer (500 Series produced by X-Rite). Next, the fixed image on the part whose image density has been measured is rubbed (back and forth five times) with a lens-cleaning paper while applying a load of 4.9 kPa (50 g/cm$^2$), after which the image density is measured again.

Next, the rate of decrease in image density before and after the rubbing was calculated using the formula below. The obtained image density decrease rate was evaluated according to the evaluation criteria shown below.

Image density decrease rate=(image density before rubbing−image density after rubbing)/(image density before rubbing)×100

Evaluation Criteria
AA: Image density decrease rate of less than 1.0%
A: Image density decrease rate of less than 3.0%
B: Image density decrease rate of at least 3.0% but less than 5.0%
C: Image density decrease rate of at least 5.0% but less than 8.0%
D: Image density decrease rate of at least 8.0%

Hot Offset Resistance
Paper: CS-064 (64.0 g/m$^2$)
(sold by Canon Marketing Japan K.K.)
Toner laid-on level on paper: 0.08 mg/cm$^2$
(Adjusted by altering the direct current voltage VDC of the developer bearing member, the charging voltage VD of the electrostatic latent image bearing member and the laser power)
Evaluation image: An image measuring 2 cm×20 cm was disposed at the long edge in the paper passing direction an A4 sheet of the paper mentioned above in such a way as to leave a margin of 2 mm from the edge of the paper
Test environment: Normal temperature low humidity environment (temperature: 23° C., humidity: 5% RH) (hereinafter abbreviated to "N/L")

Fixation temperature: Temperature increase in increments of 5° C. from 140° C.

Processing speed: 400 mm/sec

The evaluation image mentioned above was outputted, and hot offset resistance was evaluated on the basis of the criteria below in terms of the maximum fixation temperature at which hot offsetting did not occur.

Evaluation Criteria

AA: At least 175° C.
A: At least 165° C. but lower than 175° C.
B: At least 155° C. but lower than 165° C.
C: At least 145° C. but lower than 155° C.
D: Lower than 145° C.

Winding Resistance

Paper: CS-064 (64.0 g/m$^2$)
(sold by Canon Marketing Japan K.K.)
Toner laid-on level on paper: 0.55 mg/cm$^2$
(Adjusted by altering the direct current voltage VDC of the developer bearing member, the charging voltage VD of the electrostatic latent image bearing member and the laser power)
Evaluation image: An image measuring 2 cm×20 cm was disposed at the long edge in the paper passing direction an A4 sheet of the paper mentioned above in such a way as to leave a margin of 2 mm from the edge of the paper
Test environment: High temperature high humidity environment (temperature: 30° C., humidity: 80% RH (hereinafter abbreviated to H/H))
Fixation temperature: Temperature increase in increments of 5° C. from 140° C.
Processing speed: 400 mm/sec The evaluation image mentioned above was outputted, and winding resistance was evaluated on the basis of the criteria below in terms of the maximum fixation temperature at which winding did not occur.

Evaluation Criteria

AA: At least 175° C.
A: At least 165° C. but lower than 175° C.
B: At least 155° C. but lower than 165° C.
C: At least 145° C. but lower than 155° C.
D: Lower than 145° C.

Scratch Resistance

Paper: Oce Top Coated Pro Silk 270 (270.0 g/m$^2$) (sold by Oce)
Evaluation image: An image measuring 2 cm×15 cm was disposed in the center of an A4 sheet of the paper mentioned above
Toner laid-on level on paper: 0.70 mg/cm$^2$
(Adjusted by altering the direct current voltage VDC of the developer bearing member, the charging voltage VD of the electrostatic latent image bearing member and the laser power)
Test environment: Normal temperature normal humidity environment (temperature: 23° C., humidity: 50% RH) (hereinafter abbreviated to "N/N")
Fixation temperature: 160° C.
Processing speed: 400 mm/s Using a HEIDON TYPE 14FW surface property tester produced by Shinto Scientific Co., Ltd., a load of 200 g was applied to a recording paper on which the evaluation image mentioned above had been outputted, a scratch having a length of 30 mm was then made on the image at a speed of 60 mm/min using a needle having a diameter of 0.75 mm, and the scratch produced on the image was then evaluated.

Moreover, the areal ratio of detached toner was determined by binarizing the area from which the toner had detached relative to the scratched area by carrying out image processing.

Evaluation Criteria

A: No image scratching
B: Image scratching Areal ratio of detached toner of less than 4.0%
C: Image scratching Areal ratio of detached toner of at least 4.0% but less than 7.0%
D: Image scratching Areal ratio of detached toner of at least 7.0%

Charge Rising Performance

Evaluation of charge rising performance was carried out by measuring changes in density when images having different image print coverage rates were outputted. An image having a low image ratio is outputted, the charge on a toner in the developing machine is saturated, and an image having a high image ratio is then outputted. Therefore, a change in density occurs as a result of differences in charge between a charge-saturated toner in the developing machine and a toner freshly supplied to the developing machine.

A toner having rapid charge rising performance becomes charge-saturated immediately after being supplied to the developing machine, and therefore undergoes little change in density. However, a toner having slow charge rising performance requires time to become charge-saturated after being supplied to the developing machine, meaning that the charge amount of the overall toner decreases and changes in density occur.

Using an imagePress C800 full-color copier produced by Canon as an image forming apparatus, two component developer 1 was placed in the cyan developing device of the image forming apparatus, and then subjected to the following evaluations.

A modification was made such that the mechanism for discharging excess magnetic carrier in the developing device from the developing device was removed. GF-0081 ordinary paper (A4, basis weight 81.4 g/m$^2$, sold by Canon Marketing Japan) was used as the evaluation paper.

Adjustments were made so that the toner mounting amount on a paper for an FFh image (a solid image) was 0.45 mg/cm$^2$.

Firstly, an image output test was conducted by printing 1000 prints at an image ratio of 1%. While continuously feeding 1000 sheets of paper, paper feeding was carried out under the same developing conditions and transfer conditions (no calibration) as those used when printing the first print. The purpose of configuring in this way is to saturate charge on the toner in the developing machine.

Next, an image output test was conducted by printing 1000 prints at an image ratio of 80%. While continuously feeding 1000 sheets of paper, paper feeding was carried out under the same developing conditions and transfer conditions (no calibration) as those used when printing the first print.

The image density of the first print printed at an image ratio of 80% was taken to be the initial density and the density of the 1000th image printed at an image ratio of 80% was measured and evaluated according to the criteria shown below.

(1) Measurement of Change in Image Density

Using an X-Rite color reflection densitometer (500 Series produced by X-Rite), the image density of the first print printed at an image ratio of 80% and the image density of the 1000th print printed at an image ratio of 80% were measured, and the density difference A was evaluated according to the following criteria.

Evaluation Criteria: Density Difference A
  A: Less than 0.03
  B: At least 0.03 but less than 0.06
  C: At least 0.06 but less than 0.10
  D: At least 0.10

Charging Performance in High Temperature High Humidity Environment (Charge Maintaining Properties)-1

A toner on an electrostatic latent image bearing member was collected through suction using a cylindrical metal pipe and a cylindrical filter, and the triboelectric charge amount of the toner was calculated.

Specifically, the triboelectric charge amount of the toner on the electrostatic latent image bearing member was measured using a Faraday Cage. The Faraday cage is a coaxial double cylinder, with the inner cylinder being insulated from the outer cylinder. When a charged body having a charge amount Q is placed inside the inner cylinder, it is as if a metal cylinder having the charge amount Q is present as a result of electrostatic induction. This induced charge amount was measured using an electrometer (a Keithley 6517A produced by Keithley), and the triboelectric charge amount of the toner was determined by dividing the charge amount Q (mC) by the mass of toner M (kg) in the inner cylinder, that is, (Q/M).

$$\text{Triboelectric charge amount of toner (mC/kg)}=Q/M$$

Firstly, an evaluation image used for winding resistance was formed on an electrostatic latent image bearing member, rotation of the electrostatic latent image bearing member was stopped before the image was transferred to an intermediate transfer member, toner on the electrostatic latent image bearing member was collected through suction using a cylindrical metal pipe and a cylindrical filter, and the "initial Q/M" was measured.

Next, the developing device was allowed to rest for 2 weeks in an evaluation apparatus in a high temperature high humidity (H/H) environment (30° C., 80% RH), after which the same procedure as that carried out before being allowed to rest was carried out, and the charge per unit mass on the electrostatic latent image bearing member after being allowed to rest (Q/M (mC/kg)) was measured. The value of Q/M per unit mass on the electrostatic latent image bearing member before being allowed to rest is denoted by "initial Q/M" and the value of Q/M per unit mass on the electrostatic latent image bearing member after being allowed to rest is denoted by "Q/M after rest", and the value of ("Q/M after rest"/"initial Q/M"×100) was calculated as the retention rate and assessed according to the criteria shown below.

Evaluation Criteria
  A: Retention rate of at least 90%
  B: Retention rate of at least 85% but less than 90%
  C: Retention rate of at least 80% but less than 85%
  D: Retention rate of less than 80%

Charging Performance in High Temperature High Humidity Environment (Charge Maintaining Properties)-2

Charge maintaining properties were evaluated in a high temperature high humidity environment more severe than the high temperature high humidity environment mentioned above.

Using a method similar to that used for charge maintaining properties in a high temperature high humidity environment described above, "initial Q/M" was measured and "Q/M after rest" was then measured after placing the developing device in an evaluation apparatus in a higher temperature higher humidity (SHISH) environment (40° C., 95% RH) and allowing to rest for five days, after which the value of ("Q/M after rest"/"initial Q/M"×100) was calculated as the retention rate and assessed according to the criteria shown below.

Evaluation Criteria
  A: Retention rate of at least 90%
  B: Retention rate of at least 85% but less than 90%
  C: Retention rate of at least 80% but less than 85%
  D: Retention rate of less than 80%

Rubfastness
  Paper: Image Coat Gloss 158 (158.0 g/m$^2$)
  (sold by Canon Marketing Japan K.K.)
  Toner laid-on level on paper: 0.05 mg/cm$^2$ (2Fh image)
  (Adjusted by altering the direct current voltage VDC of the developer bearing member, the charging voltage VD of the electrostatic latent image bearing member and the laser power)
  Evaluation image: An image measuring 3 cm×15 cm was disposed in the center of an A4 sheet of the paper mentioned above
  Fixing test environment: Normal temperature normal humidity environment (temperature: 23° C., humidity: 50% RH) (hereinafter abbreviated to "N/N")
  Fixation temperature: 180° C.
  Processing speed: 377 mm/sec The evaluation image mentioned above was outputted and rubfastness was evaluated. Difference in reflectance was used as an indicator for evaluating rubfastness.

Firstly, a load of 0.5 kgf is applied to the image portion of the evaluation image using a JSPS (Japan Society for the Promotion of Science) type rubfastness tester (AB-301 produced by Tester Sangyo Co., Ltd.), and a fresh evaluation paper is rubbed (back-and-forth 10 times). Next, using a reflectometer (a REFLECTOMETER MODEL TC-6DS produced by Tokyo Denshoku Co., Ltd.), the reflectance of rubbed parts and the reflectance of non-rubbed parts are measured using the paper on which the evaluation image has been rubbed.

Next, the difference in reflectance before and after rubbing was calculated using the formula below. The obtained difference in reflectance was evaluated according to the evaluation criteria shown below. Evaluations of A to C were assessed as being good.

$$\text{Difference in reflectance}=\text{reflectance of non-rubbed parts}-\text{reflectance of rubbed parts}$$

Evaluation Criteria
  A: Less than 1.0%
  B: At least 1.0% but less than 2.0%
  C: At least 2.0% but less than 3.0%
  D: At least 3.0%

Examples 2 to 59 and Comparative Examples 1 to 14

Evaluations were carried out in the same way as for Example 1, except that two component developers 2 to 66 were used instead of two component developer 1. Evaluation results are shown in Table 9-1 and Table 9-2.

TABLE 9-1

| Example | Two component developer No. | Low-temperature fixability DDR % | Rank | Hot offset resistance Tem °C. | Rank | Winding resistance Tem °C. | Rank | Charge rising performance DDf Δ | Rank | High-humidity/temperature charging performance ReR % | Rank | High-humidity/temperature charging performance 2 ReR % | Rank | Bending strength WBR % | Rank | Image intensity WBR % | Rank |
|---|---|---|---|---|---|---|---|---|---|---|---|---|---|---|---|---|---|
| Example 1 | 1 | 0.2 | AA | 185 | AA | 180 | AA | 0.01 | A | 92 | A | 92 | A | 0 | A | 2.2 | C |
| Example 2 | 2 | 0.2 | AA | 185 | AA | 180 | AA | 0.01 | A | 91 | A | 91 | A | 0 | A | 2.1 | C |
| Example 3 | 3 | 0.4 | AA | 180 | AA | 180 | AA | 0.01 | A | 91 | A | 91 | A | 0.8 | B | 2.6 | C |
| Example 4 | 4 | 0.4 | AA | 180 | AA | 175 | AA | 0.01 | A | 91 | A | 91 | A | 0.8 | B | 2.6 | C |
| Example 5 | 5 | 0.5 | AA | 185 | AA | 170 | A | 0.02 | A | 91 | A | 91 | A | 1.5 | B | 2.5 | C |
| Example 6 | 6 | 0.6 | AA | 185 | AA | 180 | AA | 0.01 | A | 91 | A | 91 | A | 1.2 | B | 2.4 | C |
| Example 7 | 7 | 0.7 | AA | 185 | AA | 180 | AA | 0.01 | A | 91 | A | 91 | A | 1.0 | B | 2.5 | C |
| Example 8 | 8 | 1.5 | A | 185 | AA | 185 | AA | 0.02 | A | 90 | A | 90 | A | 1.2 | B | 2.6 | C |
| Example 9 | 9 | 0.4 | AA | 180 | AA | 170 | A | 0.02 | A | 90 | A | 90 | A | 0 | A | 2.2 | C |
| Example 10 | 10 | 0.4 | AA | 180 | AA | 170 | A | 0.02 | A | 90 | A | 90 | A | 0 | A | 2.2 | C |
| Example 11 | 11 | 0.8 | AA | 180 | AA | 165 | A | 0.02 | A | 90 | A | 90 | A | 0.8 | B | 2.4 | C |
| Example 12 | 12 | 0.7 | AA | 180 | AA | 165 | A | 0.05 | B | 82 | C | 80 | C | 1.2 | B | 2.8 | C |
| Example 13 | 13 | 0.8 | AA | 170 | A | 165 | A | 0.02 | A | 92 | A | 92 | A | 1.5 | B | 2.8 | C |
| Example 14 | 14 | 0.8 | AA | 180 | AA | 170 | A | 0.02 | A | 92 | A | 92 | A | 1.2 | B | 2.7 | C |
| Example 15 | 15 | 3.4 | B | 180 | AA | 170 | A | 0.02 | A | 92 | A | 92 | A | 1.2 | B | 2.8 | C |
| Example 16 | 16 | 0.9 | AA | 165 | A | 160 | B | 0.02 | A | 92 | A | 92 | A | 1.6 | B | 2.6 | C |
| Example 17 | 17 | 0.7 | AA | 165 | A | 160 | B | 0.09 | C | 88 | B | 88 | B | 1.5 | B | 2.6 | C |
| Example 18 | 18 | 0.8 | AA | 165 | A | 160 | B | 0.05 | B | 88 | B | 88 | B | 1.4 | B | 2.7 | C |
| Example 19 | 19 | 0.8 | AA | 165 | A | 160 | B | 0.02 | A | 92 | A | 92 | A | 1.2 | B | 2.6 | C |
| Example 20 | 20 | 0.7 | AA | 165 | A | 160 | B | 0.04 | B | 92 | A | 92 | A | 1.2 | B | 2.6 | C |
| Example 21 | 21 | 0.6 | AA | 165 | A | 160 | B | 0.02 | A | 88 | B | 88 | B | 1.2 | B | 2.4 | C |
| Example 22 | 22 | 0.7 | AA | 165 | A | 160 | B | 0.05 | B | 87 | B | 87 | B | 1.2 | B | 2.8 | C |
| Example 23 | 23 | 0.9 | AA | 165 | A | 155 | B | 0.05 | B | 87 | B | 87 | B | 5.6 | C | 2.8 | C |
| Example 24 | 24 | 0.9 | AA | 165 | A | 160 | B | 0.07 | C | 86 | B | 86 | B | 3.2 | B | 2.2 | C |
| Example 25 | 25 | 0.7 | AA | 165 | A | 160 | B | 0.05 | B | 88 | B | 88 | B | 3.0 | B | 2.6 | C |
| Example 26 | 26 | 0.6 | AA | 165 | A | 160 | B | 0.02 | A | 90 | A | 90 | A | 2.8 | B | 2.4 | C |
| Example 27 | 27 | 0.4 | AA | 165 | A | 160 | B | 0.04 | B | 91 | A | 91 | A | 2.7 | B | 2.5 | C |
| Example 28 | 28 | 0.5 | AA | 165 | A | 160 | B | 0.05 | B | 91 | A | 91 | A | 2.4 | B | 2.5 | C |
| Comparative Example 8 | 29 | 0.5 | AA | 165 | A | 160 | B | 0.05 | B | 87 | B | 87 | D | 2.1 | B | 2.6 | C |
| Comparative Example 9 | 30 | 0.4 | AA | 165 | A | 155 | B | 0.05 | B | 89 | B | 89 | D | 5.3 | C | 2.8 | C |

TABLE 9-2

| Example | Two component developer No. | Low-temperature fixability DDR % | Rank | Hot offset resistance Tem °C. | Rank | Winding resistance Tem °C. | Rank | Charge rising performance DDf Δ | Rank | High-humidity/temperature charging performance ReR % | Rank | High-humidity/temperature charging performance 2 ReR % | Rank | Bending strength WBR % | Rank | Image intensity WBR % | Rank |
|---|---|---|---|---|---|---|---|---|---|---|---|---|---|---|---|---|---|
| Example 31 | 31 | 0.6 | AA | 165 | A | 155 | B | 0.05 | B | 88 | B | 88 | B | 3.3 | B | 2.4 | C |
| Example 32 | 32 | 0.6 | AA | 160 | B | 155 | B | 0.05 | B | 90 | A | 90 | A | 3.2 | B | 2.6 | C |
| Example 33 | 33 | 0.6 | AA | 165 | A | 155 | B | 0.05 | B | 90 | A | 90 | A | 2.8 | B | 2.5 | C |
| Example 34 | 34 | 1.8 | A | 165 | A | 160 | B | 0.04 | B | 91 | A | 91 | A | 2.6 | B | 2.4 | C |
| Example 35 | 35 | 4.2 | B | 165 | A | 150 | B | 0.04 | B | 91 | A | 91 | A | 2.5 | B | 2.2 | C |
| Example 36 | 36 | 0.8 | AA | 155 | B | 145 | C | 0.05 | B | 91 | A | 91 | A | 2.2 | B | 2.6 | C |
| Example 37 | 37 | 3.8 | B | 150 | C | 160 | B | 0.05 | B | 91 | A | 91 | A | 2.4 | B | 2.5 | C |
| Example 38 | 38 | 0.8 | AA | 175 | AA | 160 | B | 0.05 | B | 91 | A | 91 | A | 2.2 | B | 2.8 | C |
| Example 39 | 39 | 0.6 | AA | 180 | AA | 160 | B | 0.05 | B | 91 | A | 91 | A | 2.2 | B | 2.4 | C |
| Example 40 | 40 | 2.1 | A | 180 | AA | 155 | B | 0.05 | B | 90 | A | 90 | A | 2.2 | B | 2.6 | C |
| Comparative Example 10 | 41 | 7.2 | C | 165 | A | 150 | C | 0.05 | B | 87 | B | 82 | D | 5.6 | C | 2.8 | C |
| Example 42 | 42 | 0.6 | AA | 180 | AA | 155 | B | 0.05 | B | 87 | B | 87 | B | 3.6 | B | 2.5 | C |
| Example 43 | 43 | 0.7 | AA | 155 | C | 150 | C | 0.05 | B | 92 | A | 92 | A | 3.3 | B | 2.2 | C |
| Example 44 | 44 | 0.7 | AA | 160 | B | 155 | B | 0.04 | B | 91 | A | 91 | A | 3.4 | B | 2.5 | C |
| Example 45 | 45 | 0.8 | AA | 165 | A | 155 | B | 0.04 | B | 90 | A | 90 | A | 3.3 | B | 2.4 | C |
| Comparative Example 11 | 46 | 7.8 | C | 170 | A | 160 | B | 0.04 | B | 91 | A | 91 | D | 2.2 | B | 2.6 | C |
| Comparative Example 12 | 47 | 2.6 | A | 170 | A | 160 | B | 0.05 | B | 91 | A | 91 | D | 2.5 | B | 2.5 | C |
| Example 48 | 48 | 1.8 | A | 165 | A | 160 | B | 0.05 | B | 92 | A | 92 | A | 2.5 | B | 2.3 | C |
| Example 49 | 49 | 1.2 | A | 165 | A | 155 | B | 0.05 | B | 92 | A | 92 | A | 2.6 | B | 2.5 | C |
| Comparative Example 13 | 50 | 0.7 | AA | 155 | B | 145 | C | 0.07 | C | 87 | B | 83 | D | 5.5 | C | 2.8 | C |

TABLE 9-2-continued

| Example | Two component developer No. | Low-temperature fixability DDR % | Rank | Hot offset resistance Tem °C. | Rank | Winding resistance Tem °C. | Rank | Charge rising performance DDf Δ | Rank | High-humidity/temperature charging performance ReR % | Rank | High-humidity/temperature charging performance 2 ReR % | Rank | Bending strength WBR % | Rank | Image intensity WBR % | Rank |
|---|---|---|---|---|---|---|---|---|---|---|---|---|---|---|---|---|---|
| Example 51 | 51 | 2.2 | A | 165 | A | 150 | C | 0.05 | B | 91 | A | 91 | A | 3.7 | B | 2.6 | C |
| Example 52 | 52 | 6.9 | B | 155 | B | 160 | B | 0.05 | B | 90 | A | 90 | A | 3.8 | B | 2.5 | C |
| Comparative Example 14 | 53 | 2.3 | A | 165 | A | 155 | B | 0.08 | C | 87 | B | 87 | D | 4.2 | C | 2.7 | C |
| Comparative Example 1 | 54 | 0.5 | AA | 140 | D | 140 | D | 0.05 | B | 92 | A | 92 | A | 3 | B | 2.4 | C |
| Comparative Example 2 | 55 | 2.8 | A | 145 | C | 140 | D | 0.05 | B | 92 | A | 92 | A | 7.8 | D | 2.5 | C |
| Comparative Example 3 | 56 | 10 | D | 155 | B | 155 | B | 0.05 | B | 92 | A | 92 | A | 3.2 | B | 2.1 | C |
| Comparative Example 4 | 57 | 9.5 | D | 140 | D | 140 | D | 0.05 | B | 92 | A | 92 | A | 3.6 | B | 2.6 | C |
| Comparative Example 5 | 58 | 12.1 | D | 155 | B | 155 | B | 0.05 | B | 91 | A | 91 | A | 3.4 | B | 2.5 | C |
| Comparative Example 6 | 59 | 7.6 | C | 140 | D | 150 | C | 0.05 | B | 91 | A | 91 | A | 2.4 | B | 2.8 | C |
| Comparative Example 7 | 60 | 9.0 | D | 140 | D | 140 | D | 0.05 | B | 82 | C | 82 | C | 3 | B | 2.4 | C |
| Example 54 | 61 | 0.9 | AA | 175 | AA | 170 | A | 0.02 | A | 92 | A | 0 | A | 0.7 | A | 0.7 | A |
| Example 55 | 62 | 0.9 | AA | 175 | AA | 170 | A | 0.02 | A | 92 | A | 0 | A | 0.6 | A | 0.6 | A |
| Example 56 | 63 | 0.9 | AA | 175 | AA | 170 | A | 0.02 | A | 92 | A | 0 | A | 0.8 | A | 0.8 | A |
| Example 57 | 64 | 0.9 | AA | 175 | AA | 170 | A | 0.02 | A | 92 | A | 0 | A | 0.8 | A | 0.8 | A |
| Example 58 | 65 | 0.9 | AA | 175 | AA | 165 | A | 0.02 | A | 92 | A | 0 | A | 1.2 | A | 1.2 | B |
| Example 59 | 66 | 1.2 | A | 170 | A | 160 | B | 0.02 | A | 92 | A | 0 | A | 1.6 | A | 1.6 | B |

Abbreviations used in Table 9-1 and Table 9-2 are as follows.
DDR: density decrease rate
Tem: temperature
DDf: density difference
ReR: retention rate
WBR: white background part area ratio While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-225482, filed Dec. 13, 2019, which is hereby incorporated by reference herein in its entirety.

What is claimed is:
1. A toner, comprising:
a toner particle containing a binder resin including a crystalline first resin and an amorphous second resin;
the crystalline first resin comprising a first monomer unit represented by formula (1), a second monomer unit, and a third monomer unit represented by formula (5)

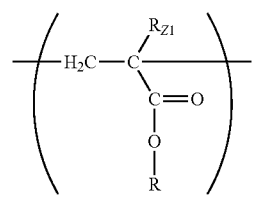
(1)

(5)

when $R_{Z1}$ denotes a hydrogen atom or a methyl group,
R denotes an alkyl group having 18 to 36 carbon atoms,
$R^5$ denotes a hydrogen atom or a methyl group,
Ph denotes a phenyl group, and
the second monomer unit is a 2-hydroxypropyl methacrylate unit, wherein
a content ratio of the first monomer unit in the crystalline first resin is at least 30.0 mass %,
a content ratio of the third monomer unit in the crystalline first resin is 10.0 to 50.0 mass %,
$21.00 \leq SP_{21}$ when $SP_{21}$ is an SP value $(J/cm^3)^{0.5}$ of the second monomer unit,
the amorphous second resin contains at least one member selected from the group consisting of a vinyl-based resin and a hybrid resin in which a vinyl-based resin and a polyester resin are bound to each other,
an observed cross section of the toner particle has a domain-matrix structure formed of a matrix that includes the crystalline first resin and domains that include the amorphous second resin,
a number average diameter of the domains is 0.10 to 2.00 μm,
$19.0 \leq SP1$ and $0.3 \leq SP2-SP1 \leq 1.3$ when SP1 $(J/cm^3)^{0.5}$ is an SP value of the crystalline first resin and SP2 $(J/cm^3)^{0.5}$ is an SP value of the amorphous second resin, and
$0.5 \leq OHVa \leq 30.0$ and $0.5 \leq OHVi \leq 30.0$ when OHVa (mg KOH/g) is a hydroxyl value of the crystalline first resin and OHVi (mg KOH/g) is a hydroxyl value of the amorphous second resin.

2. The toner according to claim 1, wherein a ratio of an area of the domains relative to an area of the cross section of the toner is 15 to 80%.

3. The toner according to claim 1, wherein 0.5≤AVa≤30.0 and 0.5≤AVi≤30.0 when AVa (mg KOH/g) is an acid value of the crystalline first resin and AVi (mg KOH/g) is an acid value of the amorphous second resin.

4. The toner according to claim 1, wherein 0≤|AVa−AVi|≤20.0 when AVa (mg KOH/g) is an acid value of the crystalline first resin and AVi (mg KOH/g) is an acid value of the amorphous second resin.

5. The toner according to claim 1, wherein 0≤|OHVa−OHVi|≤20.0 when OHVa (mg KOH/g) is a hydroxyl value of the crystalline first resin and OHVi (mg KOH/g) is a hydroxyl value of the amorphous second resin.

6. The toner according to claim 1, wherein the amorphous second resin has a softening point of 120 to 160° C.

7. The toner according to claim 1, wherein the binder resin further contains a third resin containing a resin to which the crystalline first resin and the amorphous second resin are bound.

8. The toner according to claim 1, wherein the amorphous second resin comprises a monomer unit represented by formula (5).

9. The toner according to claim 1, wherein a peak temperature of an endothermic peak of tetrahydrofuran-insoluble matter other than inorganic components in the toner is 55 to 80° C., measured using a differential scanning calorimeter, and an endothermic amount ΔHt of the endothermic peak is 3 to 30 J/g.

10. The toner according to claim 1, wherein the vinyl-based resin is a polymer of polymerizable monomers including at least one member selected from the group consisting of styrene, o-methylstyrene, m-methylstyrene, p-methylstyrene, p-phenyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-m ethoxy styrene, p-chlorostyrene, 3,4-dichlorostyrene, m-nitrostyrene, o-nitrostyrene, p-nitrostyrene, acrylic acid, methyl acrylate, ethyl acrylate, propyl acrylate, n-butyl acrylate, isobutyl acrylate, n-octyl acrylate, dodecyl acrylate, 2-ethylhexyl acrylate, stearyl acrylate, 2-chloroethyl acrylate, phenyl acrylate, methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, acrylonitrile, methacrylonitrile, acrylamide, 2-hydroxyethyl acrylate, 2-hydroxyethyl methacrylate, 2-hydroxypropyl methacrylate, 4-(1-hydroxy-1-methylbutyl)styrene and 4-(1-hydroxy-1-methylhexyl)styrene.

11. The toner according to claim 1, wherein the toner particle contains a wax, a first peak and a second peak derived from the wax are present in a temperature differential distribution of an endothermic peak of the toner, as measured using differential scanning calorimetry, a peak top temperature of the first peak is at least 70° C., the second peak is adjacent to the first peak, a peak top temperature of the second peak is higher than the peak top temperature of the first peak, and a height of a recess between the first peak and the second peak is greater than 0 W/g.

12. A two component developer comprising a magnetic carrier and the toner according to claim 1.

13. The toner according to claim 1, wherein the wherein the crystalline first resin comprises a main chain comprising the first, second and third monomer units.

14. The toner according to claim 11, wherein the wax comprises combinations of hydrocarbon-based waxes having different melting points.

* * * * *